US012625748B2

(12) United States Patent
Wang et al.

(10) Patent No.: US 12,625,748 B2
(45) Date of Patent: *May 12, 2026

(54) SOFTWARE FRAMEWORK AND DEVELOPMENT PLATFORM FOR WI-FI CHIPSETS

(71) Applicant: MaxLinear, Inc., Carlsbad, CA (US)

(72) Inventors: Qiang Wang, Freemont, CA (US); Marianna Carrera, San Jose, CA (US); Kan Hu, Shanghai (CN); Haibo Chen, Shanghai (CN); Ambroise Popper, Paris (FR)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,494

(22) Filed: Jan. 17, 2023

(65) Prior Publication Data

US 2023/0152910 A1 May 18, 2023

Related U.S. Application Data

(63) Continuation of application No. 16/724,222, filed on Dec. 21, 2019, now Pat. No. 11,586,303.

(Continued)

(51) Int. Cl.
*G06F 9/54* (2006.01)
*G06F 3/038* (2013.01)
(Continued)

(52) U.S. Cl.
CPC .............. *G06F 9/542* (2013.01); *G06F 3/038* (2013.01); *G06F 3/1254* (2013.01);
(Continued)

(58) Field of Classification Search
CPC ........ G06F 3/038; G06F 3/1254; G06F 9/542; G06F 13/102; H04L 41/08; H04W 84/02
See application file for complete search history.

(56) References Cited

U.S. PATENT DOCUMENTS 11,586,303 B2 2/2023 Wang et al.
2013/0332917 A1* 12/2013 Gaither ................... G06F 8/656
717/170

(Continued)

*Primary Examiner* — Walter J Divito
(74) *Attorney, Agent, or Firm* — Buchalter; Jason W. Croft

(57) ABSTRACT
A wireless network device comprises a wireless signal driver, an application-driver framework that includes a bidirectional interface and an application interface. The application-driver framework is configured for application-agnostic and driver-agnostic communication. The bidirectional interface communicatively couples the wireless signal driver to the application-driver framework. The bidirectional interface includes an abstraction layer via which driver-agnostic command signals and driver-agnostic event signals are communicated with the application-driver framework and via which driver-specific command signals and driver-specific event signals are communicated with the wireless signal driver. The application interface is configured to interface with applications and with the application-driver framework. The application interface is configured to communicate application-agnostic command signals and application-agnostic event signals with the application-driver framework and to communicate application-specific event signals and application-specific command signals with the one or more applications and the application-driver framework.

20 Claims, 12 Drawing Sheets

Related U.S. Application Data

(60) Provisional application No. 62/788,922, filed on Jan. 6, 2019.

(51) Int. Cl.

| | |
|---|---|
| *G06F 3/12* | (2006.01) |
| *G06F 13/10* | (2006.01) |
| *H04W 4/20* | (2018.01) |
| *H04W 84/02* | (2009.01) |

(52) U.S. Cl.

CPC .......... *G06F 13/102* (2013.01); *H04W 84/02* (2013.01); *H04W 4/20* (2013.01)

(56) References Cited

U.S. PATENT DOCUMENTS

| | | | | |
|---|---|---|---|---|
| 2016/0117207 A1* | 4/2016 | Bellessort | ............... | G06F 9/547 |
| | | | | 719/328 |
| 2016/0266929 A1* | 9/2016 | Lu | .......................... | G06F 9/5027 |
| 2017/0003991 A1* | 1/2017 | Strandzhev | ............... | G06F 9/50 |
| | | | | 359/613 |
| 2017/0205897 A1* | 7/2017 | Chun | ......................... | G06F 3/03 |
| 2018/0287900 A1 | 10/2018 | Pang et al. | | |
| 2019/0034250 A1* | 1/2019 | Fuchs | ...................... | H04L 43/10 |
| 2019/0332449 A1 | 10/2019 | Adolfsson et al. | | |
| 2020/0110584 A1* | 4/2020 | Irimescu | ................... | G06F 8/30 |
| 2020/0187209 A1* | 6/2020 | Tamura | ................. | H04W 76/15 |

\* cited by examiner

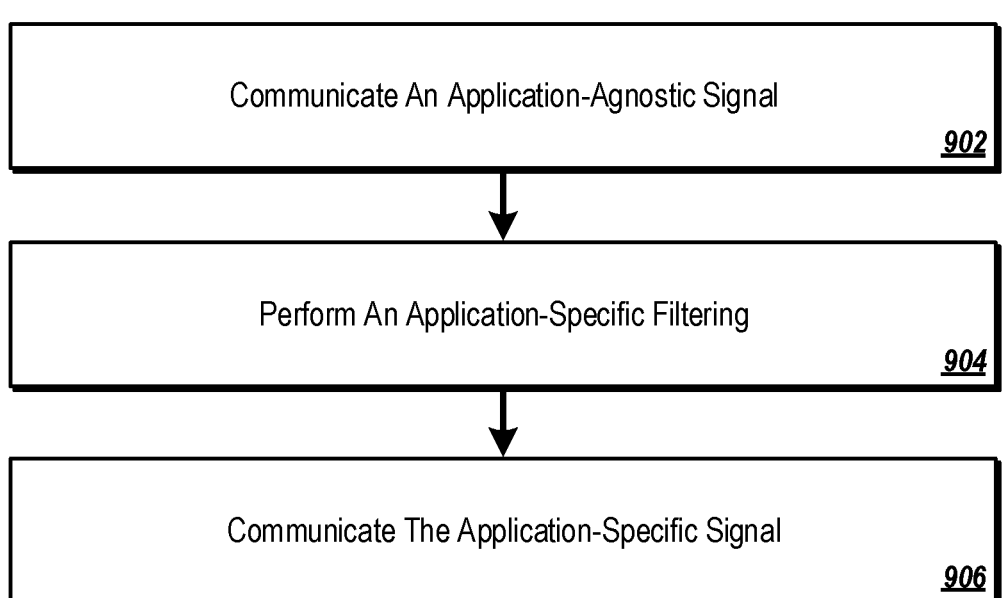
900
Communicate An Application-Agnostic Signal
*902*
Perform An Application-Specific Filtering
*904*
Communicate The Application-Specific Signal
*906*
FIG. 9

1000

Communicate The Driver-Agnostic Command Signal

_1002_

Convert The Driver-Agnostic Command Signal

_1004_

Communicate The Driver-Specific Command Signal

_1006_

Receive A Driver-Specific Event Signal

_1008_

Generate A Driver-Agnostic Even Signal

_1010_

Communicate The Driver-Agnostic Even Signal

_1012_

Perform An Application-Specific Filtering

_1014_

Communicate The Application-Specific Signal

_1016_

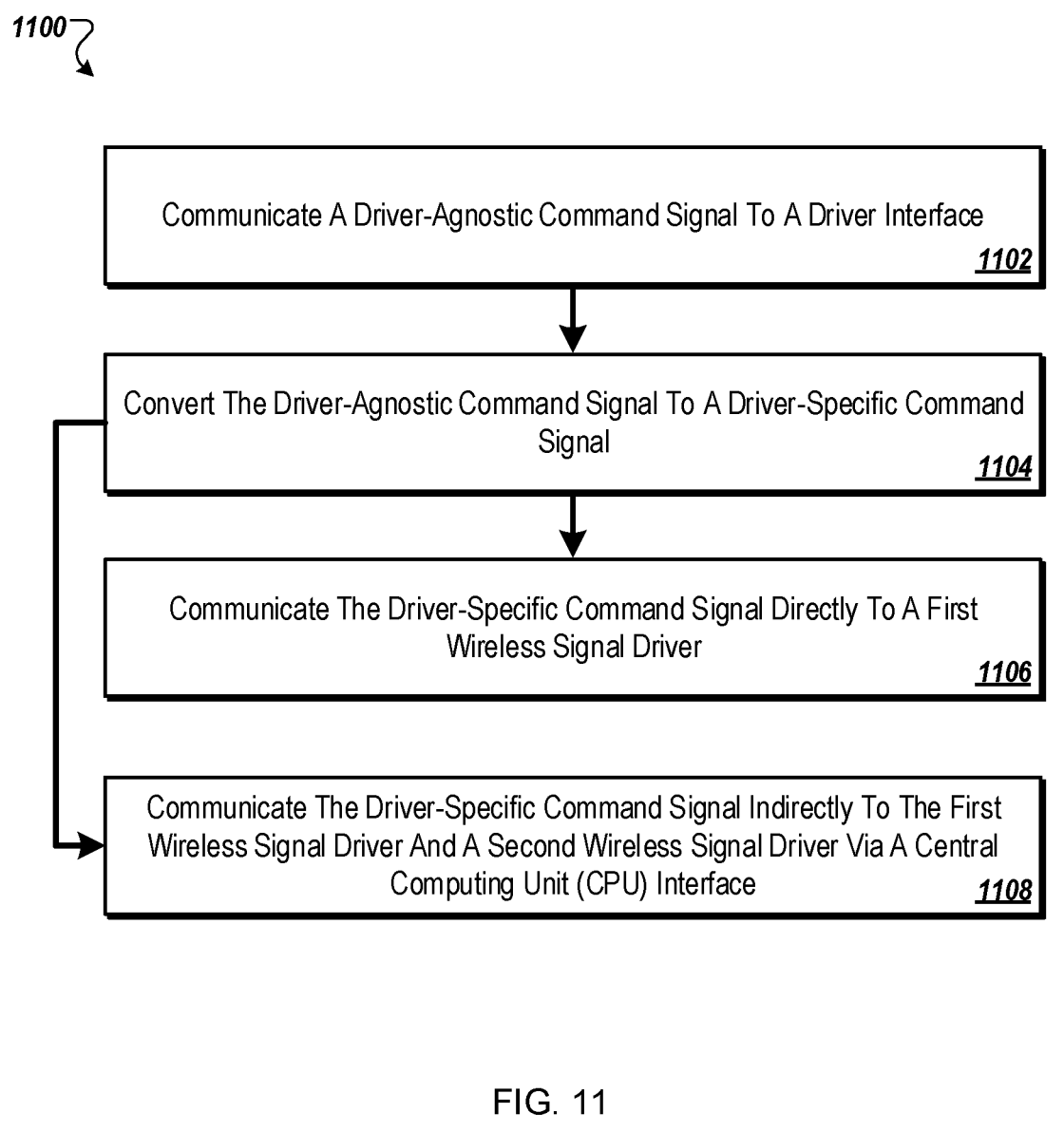

*1100*

Communicate A Driver-Agnostic Command Signal To A Driver Interface

*1102*

Convert The Driver-Agnostic Command Signal To A Driver-Specific Command Signal

*1104*

Communicate The Driver-Specific Command Signal Directly To A First Wireless Signal Driver

*1106*

Communicate The Driver-Specific Command Signal Indirectly To The First Wireless Signal Driver And A Second Wireless Signal Driver Via A Central Computing Unit (CPU) Interface          *1108*

FIG. 11

SOFTWARE FRAMEWORK AND DEVELOPMENT PLATFORM FOR WI-FI CHIPSETS

CROSS-REFERENCE TO RELATED APPLICATION

This application is a continuation of U.S. patent application Ser. No. 16/724,222, filed on Dec. 21, 2019; which claims the benefit of and priority to U.S. Provisional Application No. 62/788,922 filed Jan. 6, 2019, which is incorporated herein by reference in its entirety.

FIELD

The embodiments discussed herein are related to frameworks for wireless driver and application interfaces.

BACKGROUND

Home, outdoor, and office networks, a.k.a. wireless local area networks (WLAN) are established using a device called a Wireless Access Point (WAP). The WAP may include a router. The WAP wirelessly couples one or more the devices of the home network, e.g. wireless stations such as: computers, printers, televisions, digital video (DVD) players, security cameras and smoke detectors to one another and to the Cable or Subscriber Line through which Internet, video, and television is delivered to the home. The WAP may also couple one or more the devices of the home network via one or more wired connections. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

WAP chipsets are generally designed to handle tasks associated with different layers of the seven-layer Open Systems Interconnection (OSI) networking model. The OSI model developed by the International Standards Organization (ISO) includes physical layer 1, data link layer 2, network layer 3, transport layer 4, session layer 5, presentation layer 6, and application layer 7. The OSI layers 1-4 are considered the lower layers directed to moving data, layers 5-7 (e.g., the upper layers) are directed to application-level data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment of the invention, a wireless network device may include a wireless signal driver and an application-driver framework. The wireless signal driver, the application-driver framework, the bidirectional interface, and the application interface are configured as a Wi-Fi repeater, a wireless access point (WAP), or a Wi-Fi gateway. The application-driver framework may be configured for application-agnostic and driver-agnostic communication. The application-driver framework may include a bidirectional interface and an application interface. The bidirectional interface may communicatively couple the wireless signal driver to the application-driver framework. The bidirectional interface may include an abstraction layer via which driver-agnostic command signals and driver-agnostic event signals are communicated with the application-driver framework and via which driver-specific command signals and driver-specific event signals are communicated with the wireless signal driver. The application interface may be configured to interface one or more applications with the application-driver framework. The application interface may be configured to communicate application-agnostic command signals and application-agnostic event signals with the application-driver framework. The application interface may be configured to communicate application-specific event signals and application-specific command signals with the one or more applications and the application-driver framework. The wireless network device may comprise a processor, such as a central processing unit (CPU). The wireless signal driver and the bidirectional interface may be included in the application-driver framework and the application-driver framework may be included on the CPU. In an example, the wireless network device may include a first chipset and a second chipset. In detail, the wireless signal driver may be separate and distinct from the bidirectional interface and from the application-driver framework, the bidirectional interface and the application-driver framework are included on the first chipset, the second chipset, or both the first and second chipsets, and the wireless signal driver is included on the second chipset. The wireless signal driver, the application-driver framework, the bidirectional interface, and the application interface may be included on a single CPU. The first chipset and the second chipset may be from different vendors, have different architectures, or have different versions. The first wireless signal driver may be separate and distinct from the bidirectional interface and from the application-driver framework. The first wireless signal driver may be a third party driver or another driver. The first wireless signal driver, the application-driver framework, the bidirectional interface, a first portion of the CPU interface, and the application interface may be included on the first CPU. The second wireless driver and a second portion of the CPU interface may be included on the second CPU. The first wireless signal driver may be configured to drive a first wireless signal card and the second wireless signal driver is configured to drive a second wireless signal card. At least one application of the one or more applications may include a library. The application-driver framework may be configured to implement a user-space background process and the at least one application may be dynamically loaded by the user-space background process. At least one application may be implemented as a Linux dynamically loadable library or a standalone process interfaced by an inter-process communication bus. The one or more applications may be configured to use wireless signal information associated with a wireless network or to invoke a wireless function implemented by the wireless network and the wireless network may be generated or supported by the wireless signal driver. The one or more applications may include one or more or a combination of a home ESS management application, a media access control (MAC) sublayer management entity (MLME) delegation, a client steering application, a channel and power management application, application management, a data path control application, and a spatial diagnostic application.

According to another aspect of an embodiment of the invention, a method of wireless communication chipset interface may be implemented in a wireless network device. The method may include communicating, an application-agnostic signal between a processor of an application-driver framework, a framework component, and/or an application interface, the application-agnostic signal including an application-agnostic event signal or an application-agnostic command signal. The method may include performing, by the application interface, an application-specific filtering of the application-agnostic signal, the application-specific filtering being configured to convert the application-agnostic signal to an application-specific signal. The method may include further communicating, by the application interface, the application-specific signal between the application interface and one or more applications. Additionally, in these and other embodiments, the framework and the application interface may be configured as or included in a Wi-Fi repeater, a Wi-Fi gateway, a WAP, or another suitable wireless network device. A first application of the one or more applications may be loaded. The first application may correspond to the application-specific signal. For instance, the application-specific signal may be formatted and configured for use by the first application. The first application may be configured to process the application-specific signal and/or use some information in the application-specific signal. In some embodiments, the application may be dynamically loaded. For instance, the application may be dynamically loaded using a user-space background process. In these and other embodiments, the application may include a library. An example of the library may be a LINUX dynamically loadable library. Other suitable library types may also be implemented. Additionally or alternatively, the first application may be a standalone process interfaced by an inter-process communication bus.

According to yet another aspect of an embodiment of the invention, a method of wireless communication chipset interface may include communicating a driver-agnostic command signal. The method may include converting the driver-agnostic command signal. The driver-agnostic command signal may be converted by a driver interface. The driver-agnostic command signal may be converted to a driver-specific command signal. For example, the driver-agnostic command signal may be converted to a command signal having a particular format or configuration that a particular driver can implement, process, or use. The method may include communicating the driver-specific command signal. For example, the driver-specific command signal may be communicated by the driver interface. In some configurations, the driver-specific command signal may be communicated directly to a first wireless signal driver. Additionally or alternatively, in some configurations, the driver-specific command signal may be communicated indirectly to a second wireless signal driver via a CPU interface. The method may include receiving a driver-specific event signal. For example, the driver-specific event signal may be received from the first wireless signal driver or the second wireless signal driver via the CPU interface. The driver-specific event signal may be received at a driver interface. The driver interface may include a bidirectional interface that is comprised of two different unidirectional driver interfaces. The method may include generating a driver-agnostic event signal. For instance, the driver interface may generate the driver-agnostic event signal. The method may include communicating the driver-agnostic event signal. For example, the driver-agnostic event signal may be communicated by the driver interface to the processor and then to an application interface. As discussed above, the processor may be included in an application-driver framework in some embodiments. The application-driver framework and the application interface may be configured as or included in a Wi-Fi repeater, a Wi-Fi gateway, a WAP or another suitable wireless network device. The method may include performing an application-specific filtering of the driver-agnostic event signal. For example, the application-specific filtering may be configured to convert the driver-agnostic event signal to an application-specific event signal. The application-specific filtering of the driver-agnostic event signal may be performed by the application interface in some embodiments. The method may include communicating application-specific event signal. For example, the application-specific event signal may be further communicated between the application interface and one or more applications. The application interface may be configured to communicate the application-specific signal between the application interface and the applications. A first application of the one or more applications may be loaded. The first application may correspond to the application-specific signal. For instance, the application-specific signal may be formatted and configured for use by the first application. The first application may be configured to process the application-specific signal and/or use some information in the application-specific signal. The application may be dynamically loaded. For instance, the application may be dynamically loaded using a user-space background process. In these and other embodiments, the application may include a library. An example of the library may be a LINUX dynamically loadable library. Additionally or alternatively, the first application may be a standalone process interfaced by an inter-process communication bus.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 9 is a flow diagram of an example method of wireless communication chipset interface;

FIG. 11 is a flow diagram of an example method 1100 of application-agnostic signal communication.

DESCRIPTION OF EMBODIMENTS

Figure 1:
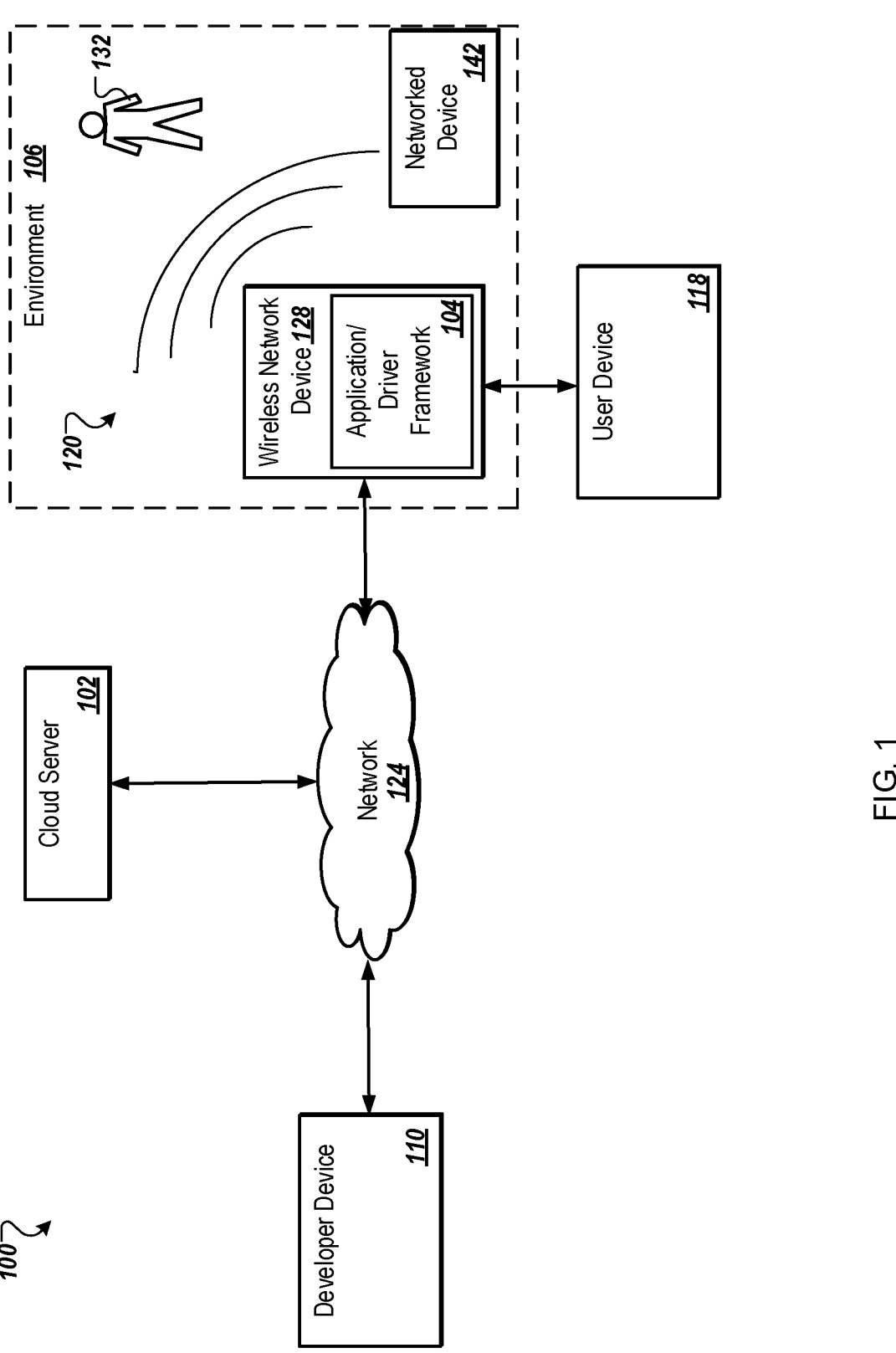
FIG. 1 illustrates a block diagram of an example operating environment of a wireless network device implementing an application-driver framework.

Many structures such as residences and businesses implement a wireless network device to host and support a wireless network. For example, a network processor or network processing unit (NPU) is a programmable microprocessor designed for processing network data packets and tasks commonly associated with the upper layers of the OSI model. The NPU may include a communication processor. Communication processors are generally developed to handle the tasks commonly associated with the lower layers of the OSI model. The communication processors are programmable, however, the communication processors may restrict access to the underlying instruction set and architecture of a chipset. The communication processors may restrict such access for various reasons such as quality-of-service, security, and the like. Thus, not all of chipsets can be programmed by a user or partnering application and can require complex integration and/customization.

Use on WAPs and other wireless network devices have increase to service home and business communication requirements. Some chipsets implemented in the WAPs are providing increased functionality for use with applications. However, development of applications for use with the chipset may require significant expertise to configure and/or depend on customized or modified chipsets for operation and integration with WAP functionality. That is, closed and/or proprietary chipset architectures fail to provide means for effective access to develop and integrate application that interoperate and leverage full functionality of chipsets. Moreover, WAP chipsets customization or modified for specific applications generally risks reduced compatibility between network components.

Accordingly, there is a need for simplified integration of applications with chipsets and CPUs in wireless network devices such as WAPs to increase operations of these devices. For example, some embodiments described in the present disclosure include methods and systems for a framework and development platform for integration of applications with chipset operations in wireless network devices. The framework may integrate complex applications on top of the chipset or CPU included in the wireless network device. The framework includes a real-time communication interface for integration of applications with advanced chipset functionality. The framework may increase compatibility with low maintenance, tight, bidirectional, integration between applications and the chipset operations such as channel management, spatial diagnostics, client steering, motion detection, and the like. The framework may implement a user-space background process (e.g., LINUX daemon csmd) that interfaces with chipset hardware or firmware operations via inter-process communication (IPC) (e.g., a Netlink-based interface). The framework may allow the applications to gather sets of statistics and events from wireless network device, as well as instruct drivers to perform specific actions and/or to send specific management frames.

The framework may enable a driver configuration that may support asynchronous events from the driver such as requests for variable-size information and delegation of management frames handling to the application. Furthermore, the framework may implement daemon and libraries to provide improved compatibility for integration with chipset operations among and between different chipset versions, manufacturers, and/or architectures. Accordingly, the framework may simplify integration between chipset of CPU operations with software (e.g., middleware) running on a NPU.

In an example embodiment, the framework, may be implemented as a modular development platform that provides application integration compatibility among and between different chipset architectures. In these and other embodiments, the framework may use a user-space background process (e.g., Linux daemon csmd) that interfaces with chipset hardware or firmware operations via IPC (e.g., a Netlink-based interface). The user-space background process may be configured to run unobtrusively in the background without direct control of a user and can be activated or triggered by occurrence of various events or conditions. The framework may also, in addition, or as an alternative, be used for one or more communication protocols, including BLUETOOTH®, Bluetooth Low Energy®, Zigbee, mmWave, etc. In at least one embodiment, communications as described in this disclosure may take the form of any combination of communication protocols. For example, message in a first communication protocol may be received by a device. The device may translate the message into a second communication protocol and may send the translated message to another device using the second communication protocol.

In some embodiments, the framework may be used to expand device connectivity. For example, a device with Wi-Fi capability may be able to, using the framework, communicate with a Bluetooth Low Energy® device. In another example, a device that is not Wi-Fi compatible may still take advantage of drivers, through the use of the framework. The framework may also be used for failover, such as when a particular communication type or protocol is overloaded or fails, the framework may use another communication type or protocol to handle communications. Using the framework, devices can receive more information from more sources that use any type of communication protocol. Example devices can include sensors, appliances, near-field communication (NFC) enable devices, mobile devices, mobility devices, automotive devices, etc. In another example, a device may have multiple modes, each with differencing capabilities. The device may enter a particular mode, such as a low-power mode and, using the framework, the device in low-power mode may still communicate with other devices. In other examples, devices may enter other modes for various reasons, such as to save battery power, reduce bandwidth usage, reduce interferences with other devices, etc. Regardless of the reason or type of mode a device may enter, the device may use the framework to continue to communicate with other devices.

These and other embodiments are described with reference to the appended Figures in which like item number indicates like function and structure unless described otherwise.

FIG. 1 illustrates a block diagram of an example operating environment 100 arranged in accordance with at least one embodiment described herein. The operating environment 100 may be implemented to enable communication of applications between a developer device 110, a cloud server 102, and a wireless network device 128. For example, the applications may be developed by a developer device 110 and communicated to the wireless network device 128 or the cloud server 102 via a network 124. A user device 118 of the wireless network device 128 may access or receive the applications from the developer device 110 and/or the cloud server 102 and load the applications on the wireless network device 128. The wireless network device 128 may then implement the applications.

The wireless network device 128 may include an application/driver framework 104 (hereinafter, "framework 104"). The framework 104 may be configured to enable interface between the applications and one or more drivers of the wireless network device 128. For example, the framework 104 may act as an abstraction layer via which signals that are driver-specific. application-specific, or communication protocol-specific are converted to agnostic signals. The framework 104 is configured to convert or filter signals such that the applications developed by the developer device 110 can interface with the drivers of the framework 104, which may enable implementation of the applications by the wireless network device 128. For example, the framework 104 may be configured to convert application-specific event signals and application-specific command signals of the applications to application-agnostic event and application-agnostic command signals, which may be communicated with the drivers. Similarly, the framework 104 may be configured to convert driver-specific event signals and driver-specific command signals to driver-agnostic event signals and driver-agnostic command signals, which may be communicated to the applications. Similarly, the framework 104 may be configured to convert communication protocol-specific event signals and communication protocol-specific command signals to communication protocol-agnostic event signals and communication protocol-agnostic command signals. Accordingly, the framework 104 provides a platform that enables the developer device 110 to customize, adapt applications for the framework 104 and to develop new applications to function with the framework 104.

The operating environment 100 may include the developer device 110, the cloud server 102, and the wireless network device 128. The developer device 110, the cloud server 102, and the wireless network device 128 or some combination thereof may be configured to communicate data and information via the network 124. Each of the network 124, the developer device 110, the cloud server 102, and the wireless network device 128 are briefly described below.

The network 124 may include any communication network configured for communication of signals between any of the components (e.g., 110, 102, and 128) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, a Wi-Fi communication network, a ZigBee communication network, a mmWave communication network, a HomePlug communication network, a message queue telemetry transport (MQTT) communication network, a MQTT-sensor (MQTT-S) communication network, a constrained application protocol (CoAP) communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, or any other protocol that may be implemented with for communication between the cloud server 102, the developer device 110, and the wireless network device 128.

The developer device 110 and the cloud server 102 may include any computer-based or hardware-based computing system. The developer device 110 and the cloud server 102 may be configured to communicate with the components of the operating environment 100 such as the wireless network device 128.

The developer device 110 may be associated with a developer. The developer may include an individual or set of individuals who develop applications using the developer device 110 that may be implemented by the wireless network device 128. Development of the applications may include using the developer device 110 to modify an existing application such that the framework 104 is capable of using the existing application. Additionally, development of the applications may include using the developer device 110 to generate new applications for implementation on the wireless network device 128. The developer device 110 may be configured to store and make accessible the applications. Additionally, in some embodiments, the developer device 110 may be configured to communicate the applications to the cloud server 102 such that the applications may be accessed by the user device 118.

The cloud server 102 may interface with the developer device 110 as well as other developer devices to generate a collection of applications. For instance, the cloud server 102 may host or support a website that lists and offers the collection of applications for the wireless network device 128. For example, the cloud server 102 may include one or more machines that operate together to execute operations, a set of distributed computers, one or more virtual machines, one or more devices, a system of interrelated or interconnected computing devices (e.g., devices in an "Internet of Things" (IoT) configuration, etc.) The user device 118 may access the applications in the collection and load them onto the wireless network device 128.

The wireless network device 128 may include a hardware-based computing system that is configured for wireless communication chipset interface. Some examples of the wireless network device 128 may include a Wi-Fi repeater, a Wi-Fi gateway, a wireless access point (WAP) or another suitable wireless network device.

The wireless network device 128 may be implemented in an environment 106. The environment 106 may include a volume or a space in which a wireless network 120 (e.g., a Wi-Fi signal) is generated and supported. The wireless network 120 may communicatively couple a networked device 142 in the environment 106. Some examples of the networked device 142 may include a computer, a printer, a television, a digital video (DVD) player, a security camera, other smart devices, sensors, and the like. Some examples of the environment 106 may include a structure (e.g., a residence or building), a community area, an airplane or another vehicle, or some combination thereof. In some embodiments, the wireless network 120 may comply with any IEEE 802.11 standard. The frequency range of each communication channel is specified in the corresponding one of the IEEE 802.11 protocols being implemented, e.g. "a", "b", "g", "n", "ac", "ad", "ax".

In some embodiments, the applications may be configured to interact with the environment 106 and to implement complex functionality of the wireless network device 128. The applications may be configured to use the wireless network 120, to use information associated with the wireless network 120, to invoke a wireless function implemented by the wireless network 120 or some combination thereof. For example, one of the applications may include a proximity sensor application. The proximity sensor application may make use of the wireless network 120 provided by the wireless network device 128. The proximity sensor application may determine movement of an individual 132 in the environment 106 based on changes to the wireless signal. For example, the wireless signal may be changed or reflected based any movement within the environment 106.

The wireless network device 128 may be configured to implement a wireless communication chipset interface. For example, the wireless network device 128 may include the framework 104. The framework 104 may be configured to provide an interface between two or more chipsets or central processing units (CPU) and may be configured to enable an interface between applications of the two or more chipsets or CPUs. As used herein, the term CPU is used, however, it may be understood with the benefit of this disclosure that the features and structures referred to as a CPU may alternatively include a chipset.

The wireless network device 128 may include several sets of components and features in addition to the framework 104. Some examples of the wireless network device 128 are provided below with reference to FIGS. 2-7. Some of these examples of the wireless network device 128 may include a signal CPU on which the applications and the framework 104 may be implemented. For example, in these and other embodiments, a single CPU may host the framework 104, which interfaces with the applications that are also stored on the CPU. In these embodiments, a wireless driver may not be necessary. For instance, the framework 104 may act as a platform to enable the applications to be implemented.

Other examples of the wireless network device 128 may include a single CPU that includes the framework 104, an application interface, and a driver interface. In these examples of the wireless network devices 128, the framework 104 enables real time interface between the wireless driver and the applications.

In yet other examples of the wireless network device 128 may include two or more CPUs. A first CPU may include the framework 104, an application interface, a driver interface, a CPU interface, a wireless driver, or some combinations thereof. These examples of the wireless network device 128 may enable interface between the applications and components or functionality on each of the CPUs. Interface between the applications may occur in real time or substantially real time. For instance, the interface may occur without material delay. Some additional details of these wireless network device 128 are provided below.

The framework 104 may be configured to enable the interface described above. In some embodiments, the framework 104 may be configured to communicate an application-agnostic signals and/or driver-agnostic signals. For example, the framework 104 may be configured to internally communicate the application-agnostic signals and/or the driver-agnostic signals between a processor, a framework component, and/or an application interface. The application-agnostic signal may include an application-agnostic event signal or an application-agnostic command signal. Similarly, the driver-agnostic signal may include a driver-agnostic event signal or a driver-agnostic command signal.

The framework 104 may be configured to perform an application-specific filtering of the application-agnostic signal. For example, the application-specific filtering may be configured to convert the application-agnostic signal to an application-specific signal. Additionally or alternatively, the framework 104 may be configured to generate driver-specific signals from the driver-agnostic signals.

The framework 104 may be configured to communicate the application-specific signal to the applications and/or to communicate the driver-specific signals to drivers of the wireless network device 128 or another driver via a CPU interface. The application-specific signal may be processed or used by the application that receives the application-specific signal. For instance, the application-specific signal may perform a task responsive to an application-specific command signal or may log or extract data responsive to receipt of an application-specific event signal. The driver-specific signal may be processed or used by the driver that receives the driver-specific signal. For instance, the driver-specific signal may perform a task responsive to a driver-specific command signal or may log or extract data responsive to receipt of a driver-specific event signal.

The framework 104 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the framework 104 may be implemented using a combination of hardware and software. Implementation in software may include rapid activation and deactivation of one or more transistors or transistor elements such as may be included in hardware of a computing system (e.g., the wireless network device 128). Additionally, software-defined instructions may operate on information within transistor elements. Implementation of software instructions may at least temporarily reconfigure electronic pathways and transform computing hardware.

Some examples of functionalities of the framework 104 with the applications may include: channel and power management; configuration of channel, bw and TxPower backoff; reporting channel preferences and radar status; spatial diagnostic; configuration and delivery of channel state information; Media Access Control (MAC) Sublayer Management Entity (MLME) delegation; support from transmit and receive of a configurable subset of management frames; support for information elements customization; support for country code 3rd byte customization; client steering; ability to generate deauth frames, BSS transition management (BTM) request frames, and to control probe/ assoc/auth response withholding; collection of non-associated STA RSSI; Support for interface MDID configuration; support for enhanced response withholding feature; home ESS database management application; support for backhaul link information; MultiAP R1 support; STA and BSS information gathering (capabilities and RSSI); support for radio/logical interface abstraction; support STA logical interfaces; support for 802.11ax interfaces, an Extended Service Set (ESS) which may include a combination of two or more interconnected BSS that may form a single sub-network to, for example, extend the range of mobility of a BSS, among others. Some of these applications are further described below.

An example application may be used for motion detection. For example, the application may use the signals generated and/or received by wireless network device 128 to detect motion within the environment 106. An object within the environment 106 may, for example, alter various characteristics of wireless signals within the environment 106. The application may detect changes in the characteristics of wireless signals within the environment 106. Based on the detected changes, the application may determine that there is motion within the environment 106.

In an example application, a spatial diagnostic application may use the framework 104 to retrieve channel state information from drivers that support such a feature. This provides information such as RSSI, noise, modulation and number of spatial streams, and the channel matrix information. The spatial diagnostic application may allow toggling of the delivery of spatial diagnostic data to the application. The application may specify how often a message is sent (e.g., period [ms]) and which STA is monitored. Drivers may be configured to monitor multiple stations simultaneously. If the capability to monitor multiple stations simultaneously is not advertised, on BSSIDs the last STA may be configured for spatial diagnostic monitoring and delivery.

In another example application, a MLME delegation application may be a management entity where the Physical layer (PHY) MAC state machines reside. Examples of states a MLME delegation may assist in various functions, for example, authenticate, deauthenticate, associate, disassociate, reassociate, beacon, probe request, etc.

Another example application may include a home ESS database management application that may enable the framework 104 to maintain up-to-date tables that include BSSes on local Wi-Fi cards, status and capabilities and the STAs that are associated or seen by any of the above BSSes, current association status and capabilities thereof. The framework 104 may export functions to read and update the tables.

In yet another example, a client steering application may allow a plugin to control two different methods to steer a client from one BSS to another. De-authentication and blacklisting methods may be applied to devices (e.g., networked device 142). For example, a client steering application (such as a self-optimizing network) may send de-authentication to a client and black list the client on the source access point (AP). The client may then choose another AP in the same ESS to re-connect. A 802.11v BSS transition request may be applied on a 802.11v enabled device. In some embodiments, the client steering application sends BSS transition request to a client with a target BSS candidate to inform the client to steer to another specific target BSS.

In a further example, a frame registration and transmission management application may allow the implementation of advanced features using the framework 104, which may include one or more drivers. Drivers may enable the user-space to register to the reception and the transmission of a subset of management frames. Drivers may also be used to advertise the precise set of capabilities (e.g., which frames are allowed for registration/transmission). In some embodiments, frames may be registered in "copy mode" (e.g., the user-space gets a copy but cannot reply) or in "bypass mode" (e.g., the user-space is expected to reply to those frames and the driver does not). Drivers may allow the user-space to register in "bypass mode" frames whose non-processing in-driver may break normal driver operations.

In another example, a passive steering actuation application may be implemented such that the framework 104 configures an enhanced response withholding feature. This allows responses to probe requests, (re)association requests, and association frames to be selectively withheld based on, for example, a type of frame whose response may be withhold, type of RSSI threshold (e.g., "max_RSSI withhold if RSSI of request is above RSSI_threshold, "min_RSSI" withhold if RSSI of request is below RSSI_threshold, etc.) RSSI Threshold, etc. Configuration can be per-client (per TA address of the Request Frame). In some embodiments, a default RSSI mode and threshold may be selected or predefined to be applied to request whose mac address is not found in the table.

Modifications, additions, or omissions may be made to the operating environment 100 without departing from the scope of the present disclosure. For example, the operating environment 100 may include one or more developer devices 110, cloud servers 102, wireless network devices 128, or any combination thereof. Moreover, the separation of various components and servers in the embodiments described herein is not meant to indicate that the separation occurs in all embodiments.

Figure 2:
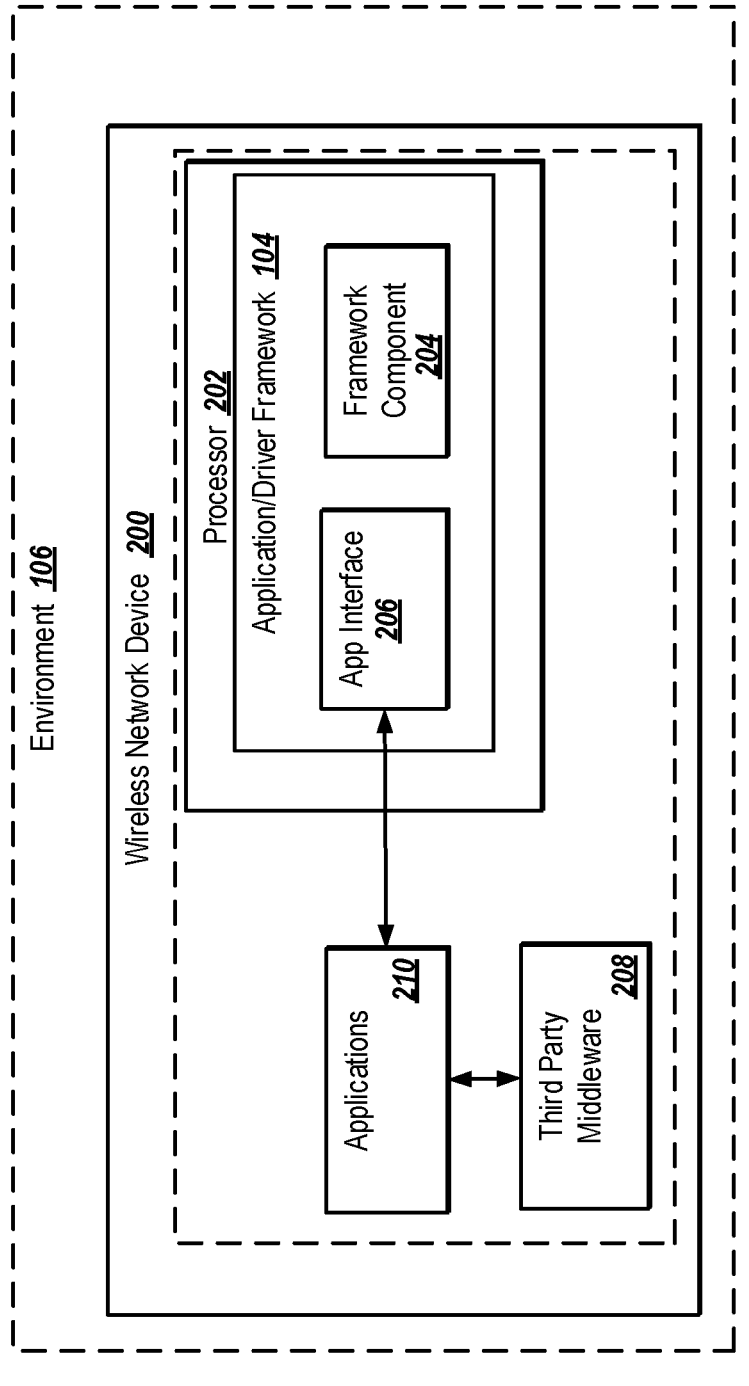
FIG. 2 illustrates a first example embodiment of the wireless network device (first wireless network device) of FIG. 1.

FIG. 2 illustrates a first example wireless network device 200 (hereinafter, first wireless network device 200). The first wireless network device 200 is an example embodiment of the wireless network device 128 described with reference to FIG. 1. For example, the first wireless network device 200 may include similar or corresponding structure and functions to the wireless network device 128. The first wireless network device 200 is depicted in the environment 106 described with reference to FIG. 1.

The first wireless network device 200 may include one or more processors 202. For ease in explanation, the one or more processors 202 may be described herein as a single processor with the understanding that any number of processors may be used. Some general examples of the processor 202 are provided with reference to FIG. 8. The processor 202 of FIG. 2 includes the framework 104. In some embodiments, the processor 202 may include the framework 104 along with applications 210 and third party middleware 208. An implementation of the processor 202 that includes the framework 104, the applications 210, and the third party middleware 208 is represented by a dashed box within the first wireless network device 200.

The first wireless network device 200 may embody a standalone implementation. In the standalone implementation, the first wireless network device 200 may include a chipset that includes the processor 202 that originated at one entity. For instance, a manufacturer of the first wireless network device 200 may also manufacture the processor 202. Accordingly, the interface between the applications 210 and the framework 104 may be relatively simple when compared to other embodiments that include multiple chipsets manufactured by multiple, separate manufactures.

Additionally, in some embodiments, the standalone implementation may not include a driver interface. Accordingly, the applications 210 may interface with one another via the framework 104. Additionally or alternatively, the applications 210 may interface with one or more features of the framework 104. For instance, the applications 210 may communicate command signals and event signals with the framework 104.

In an embodiment, the framework 104 may include an application interface 206 and/or a framework component 204. The framework component 204 may include or be coupled to a main processor of the framework 104 or of the processor 202 and is configured to perform processes to signals communicated through the framework 104. For instance, in some embodiments, the framework component 204 may be configured to receive an event signal and generate a command signal or vice versa. For instance, a particular event signal may be indicative of a particular condition in the environment 106 such as a drop in internet power or bandwidth. In response, the framework component 204 may generate a command signal that may cause one of the applications 210 to perform a function. For instance, responsive to an event message that indicates bandwidth is low, the framework component 204 may generate a command signal instructing one of the applications to switch to another channel.

The framework component 204 may be configured to communicate with the application interface 206. For example, the framework component 204 may receive and transmit application-agnostic signals with the application interface 206. The framework component 204 may act as at least a portion of an abstraction layer via which the signals are converted and communicated.

The application interface 206 may be configured to communicate with the applications 210 and with the framework component 204. In general, signals communicated between the applications 210 and the application interface 206 may be application-specific. For instance, the application interface 206 may communicate an application-specific command to the applications 210. Additionally, the applications 210 may communicate application-specific event signals to the application interface 206. Moreover, signals communicated between the application interface 206 and the framework component 204 may be application-agnostic. In some embodiments, the application interface 206 may receive an application-specific signal from the applications 210 and perform a filtering process to convert the application-specific signal to an application-agnostic signal. The application-agnostic signal may be communicated to the framework component 204 for processing, use, or communication elsewhere.

The applications 210 generally includes one or more applications. The applications may be loaded by the framework 104. For instance, the framework component 204 may be configured to load the applications such that the applications may perform a function. In some embodiments, one or more of the applications 210 may be dynamically loaded. For instance, the applications 210 may be dynamically loaded using a user-space background process. For example, in some embodiments, the applications 210, the third party middleware 208, and the framework 104 may be included in a user space. Other portions of the processor 202 may be included in a kernel space. In these embodiments, the applications 210 may be dynamically loaded by a background process implemented in the user space of the processor 202.

In these and other embodiments, the applications 210 may include a library. An example of the library may be a LINUX dynamically loadable library. Other suitable library types may also be implemented. For example, when the applications 210 includes a library, the application interface 206 may include a set of callback functions. Additionally or alternatively, one or more of the applications 210 may be a standalone process interfaced by an inter-process communication bus. For example, when the applications 210 includes a process, the application interface 206 may include an inter-process communication bus.

The third party middleware 208 may be provided by a third party. For example, referring to FIG. 1, the developer device 110 may generate the middleware 208 to enable the implementation of the applications 210. In some embodiments, the first wireless network device 200 may include software in addition to or instead of the third party middleware 208. The software may again provide a bridge to the applications 210.

Figure 3:
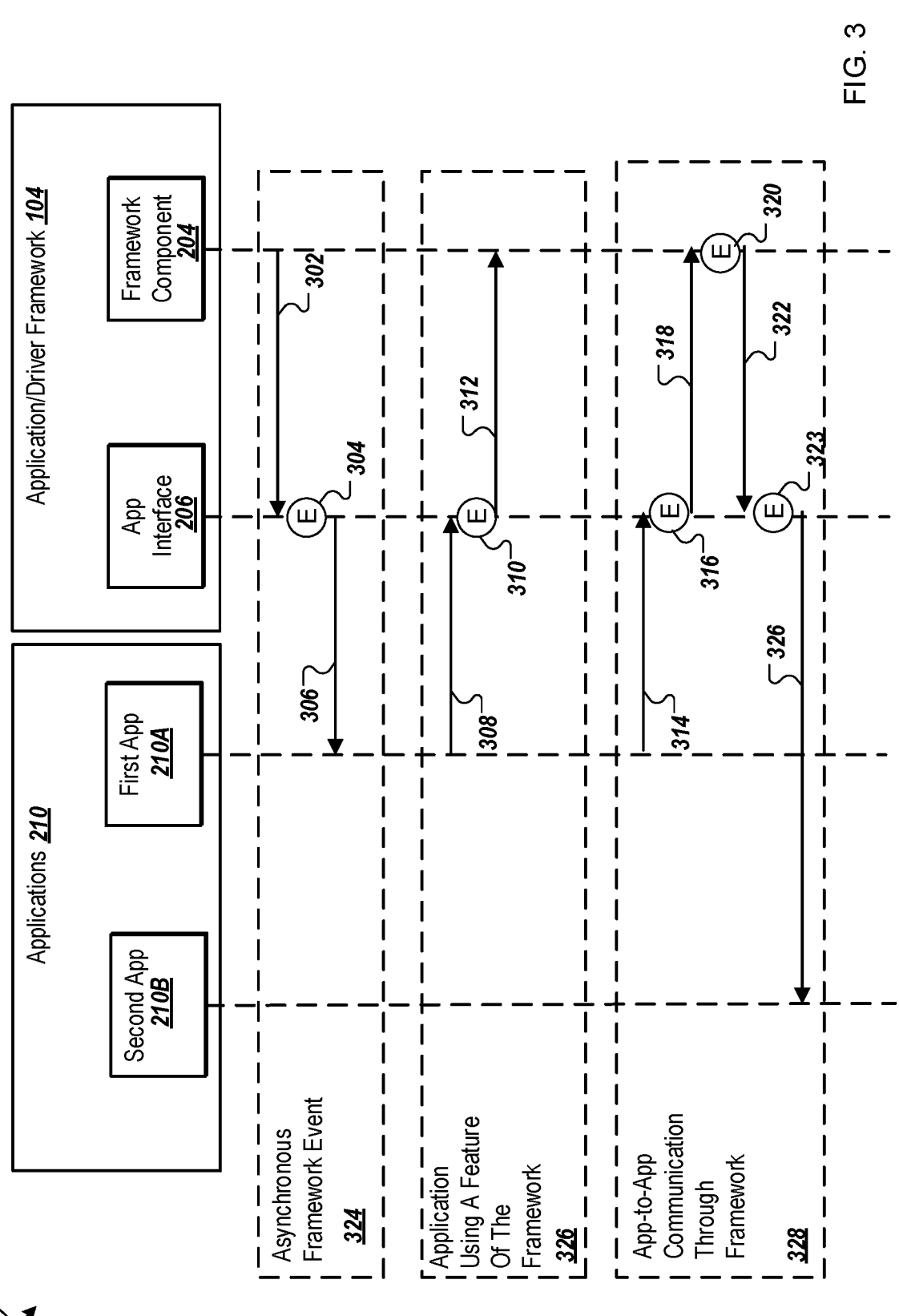
FIG. 3 illustrates sequence charts of example processes that may be implemented by the first wireless network device of FIG. 2.

FIG. 3 illustrates sequence charts 300 of example processes 324, 326, and 328 that may be implemented by a network device, such as the first wireless network device 200 of FIG. 2. FIG. 3 includes the applications 210, the framework 104, the application interface 206, and the framework component 204 of FIG. 2. Within the applications 210, two example applications, a first application 210A (in FIG. 3 as first app 210A) and a second application 210B (in FIG. 3 as second app 210B). The first and second applications 210A and 210B are examples of the applications 210 described with reference to FIGS. 1 and 2.

A first process 324 is an asynchronous framework event. Example framework events may include a periodic application update that is due, an indication that an application should restart, an indication that an application should quit, etc. The first process 324 may begin at the framework component 204. The framework component 204 may communicate a framework event to the application interface 206 (302 in FIG. 3). The framework event may be included in an application-agnostic event signal. At the application interface 206, filtering may be performed (304 in FIG. 3). The filtering may be performed by the application interface 206 to generate an application-specific event signal from the application-agnostic event signal. The application-agnostic event signal may then be communicated to the first application 210A (306 in FIG. 3).

A second process 326 is an application using a feature of the framework. Example features may include an application that is to update itself, an application that may restart, an application that may quit, etc. The second process 326 may be similar to the first process 324 in an opposite direction. The second process 326 may begin at the first application 210A (308 in FIG. 3). The first application 210A may communicate a signal to the application interface 206. The signal may include an invoke command, which may be specific to the first application 210A. For instance, the invoke command may be formatted according to the language and operation of the first application 210A. The application interface 206 may perform some filtering of the signal communicated from the first application 210A (310 in FIG. 3). The filtering may generate an application-agnostic signal, which may be communicated to the framework component 204 (312 in FIG. 3).

A third process 328 is an application-to-application communication through the framework 104. The third process 328 includes a portion of the first process 324 and the second process 326. For instance, the third process 328 may begin at the first application 210A. The first application 210A may communicate a command signal to the application interface 206 (314 in FIG. 3). The command signal may include an application-specific command signal in some embodiments. The application interface 206 may perform some filtering of the signal communicated from the first application 210A (316 in FIG. 3). The filtering may generate an application-agnostic command signal, which may be communicated to the framework component 204 (318 in FIG. 3). The framework component 204 may perform some processing of the signal communicated from the application interface 206 (320 in FIG. 3). For instance, the application-agnostic command signal may be validated or checked. The framework component 204 may communicate a framework event to the application interface 206 (322 in FIG. 3). The framework event may be included in an application-agnostic event signal. The application interface 206 may filter the application-agnostic event signal (323 in FIG. 3) to generate an application-specific event signal from the application-agnostic event signal. The application-agnostic event signal may then be communicated to the second application 210B (326 in FIG. 3).

Figure 4:
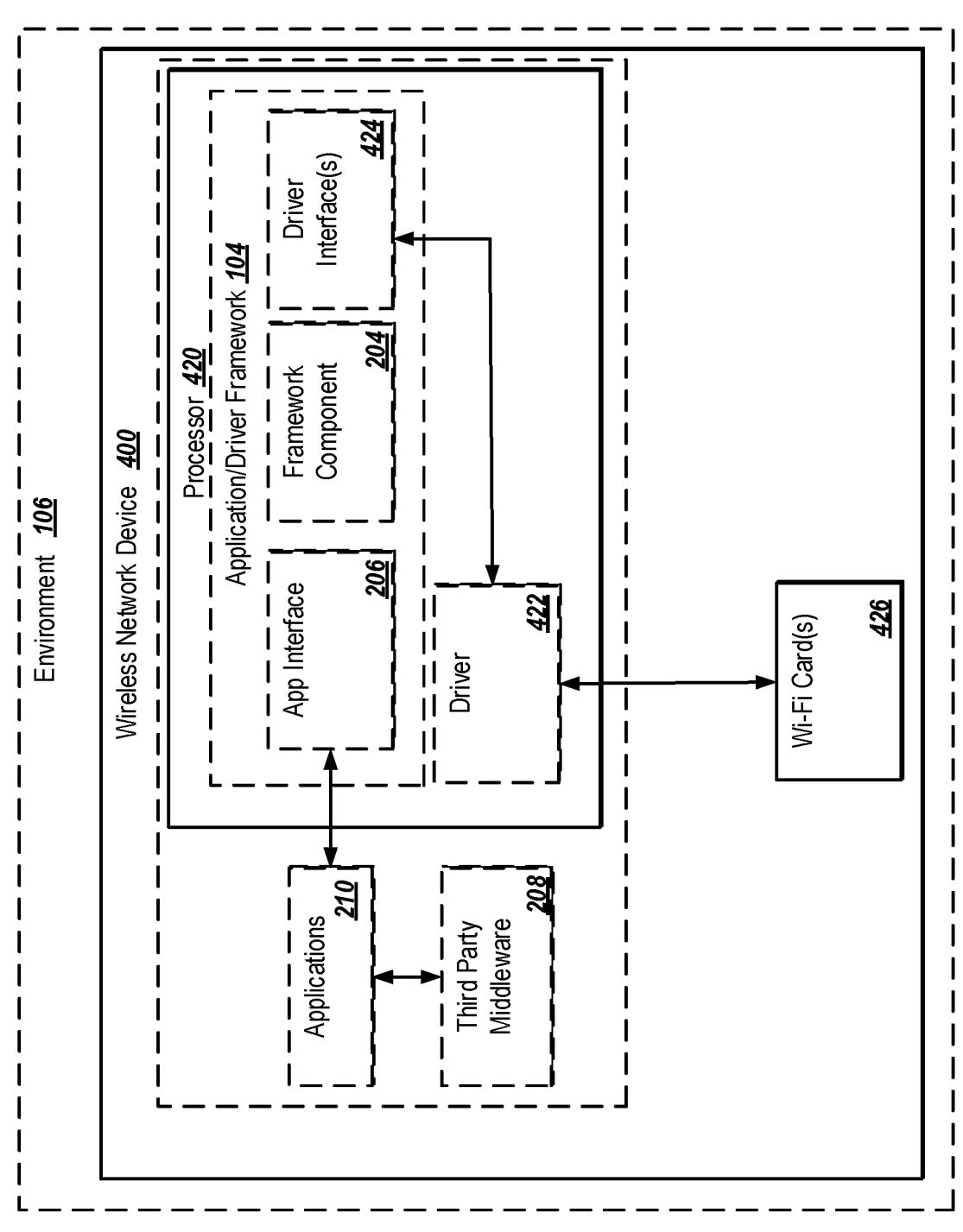
FIG. 4 illustrates a second example embodiment of the wireless network device (second wireless network device) of FIG. 1.

FIG. 4 illustrates a second example wireless network device 400 (hereinafter, second wireless network device 400). The second wireless network device 400 is an example embodiment of the wireless network device 128 described with reference to FIG. 1. For example, the second wireless network device 400 may include similar or corresponding structure and functions to the wireless network device 128. Additionally, the second wireless network device 400 includes the framework component 204, the application interface 206, the applications 210, the framework 104, and the third party middleware 208. The second wireless network device 400 is depicted in the environment 106 described with reference to FIG. 1. Description of these components is not repeated.

Like the first wireless network device 200 of FIG. 2, the second wireless network device 400 may include a single processor 420. The processor 420 as depicted in FIG. 4 includes the framework 104. In some embodiments, the processor 420 may include the framework 104 along with applications 210 and third party middleware 208. The processor 420 including the framework 104, the applications 210, and the third party middleware 208 is represented by a dashed box within the second wireless network device 400.

The second wireless network device 400 may embody another standalone implementation. For instance, the second wireless network device 400 may include a chipset that includes the processor 420 that originated at one entity. For instance, a manufacture of the wireless network device 400 may also manufacture the processor 420. Accordingly, the interface between the applications 210 and the framework 104 may be simple when compared to other embodiments that include multiple chipsets manufactured by multiple, separate manufactures.

In the embodiment of FIG. 4, the framework 104 may include the application interface 206, the framework component 204, and a driver interface 424. The driver interface 424 may be configured modify signals and to communicate signals with the framework component 204 and a driver 422. In some embodiments, the driver interface 424 may include a bidirectional interface. For example, driver-agnostic signals may be communicated between the framework component 204 and driver interface 424. Additionally, driver-specific signals may be communicated between the driver interface 424 and the driver 422. The driver 422 may interact with a Wi-Fi card 426, which may be positioned on the processor 420 or in the environment 106. The Wi-Fi card

426 may produce a wireless signal to generate a wireless network such as the wireless network 120.

In some embodiments, a portion of the driver 422 and the Wi-Fi card 426 may be included in a kernel space and the remaining components may be included in a user space. In these and other embodiments, one or more of the applications 210 may be dynamically loaded using a user-space background process.

Figure 5:
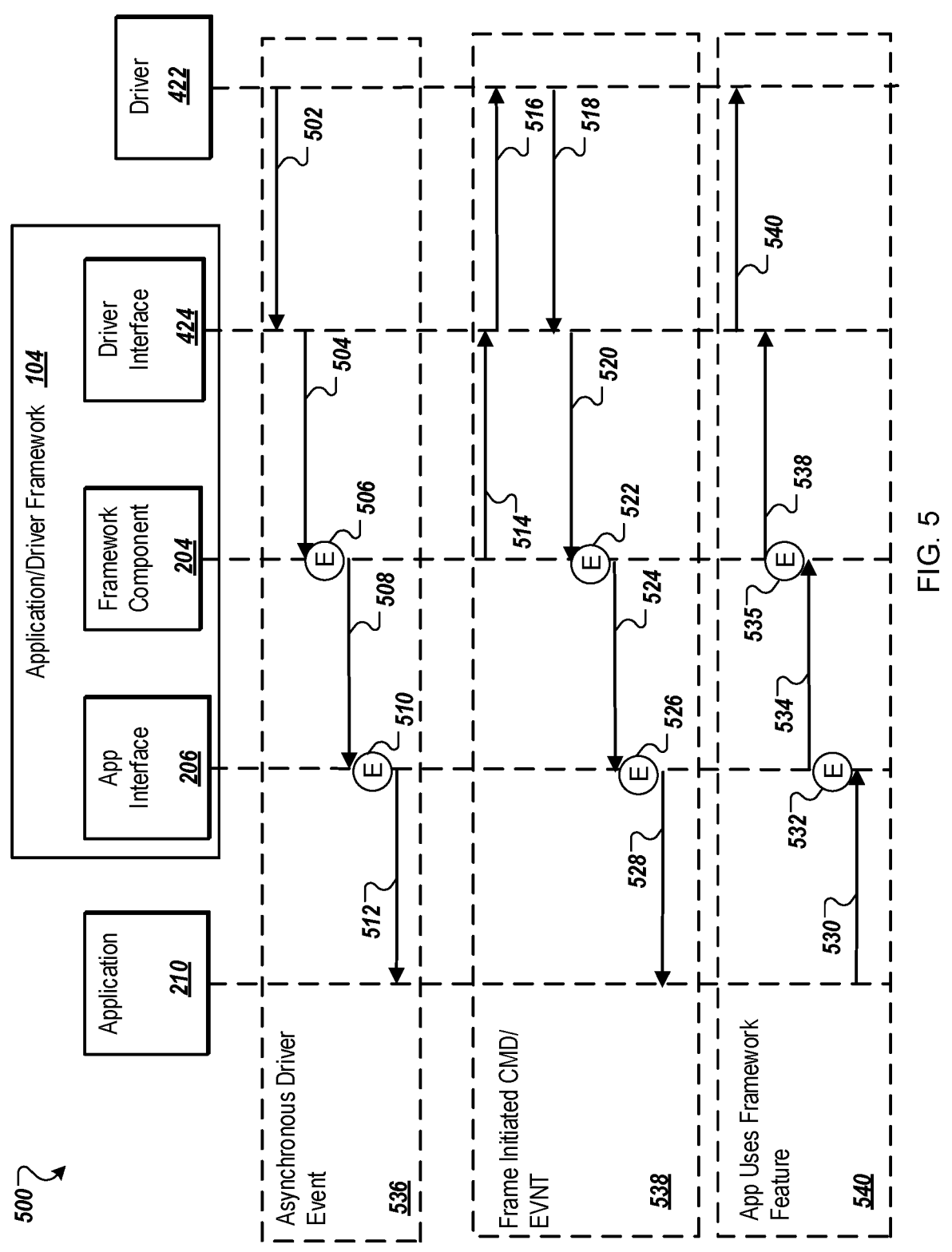
FIG. 5 illustrates sequence charts of example processes that may be implemented by the second wireless network device of FIG. 4.

FIG. 5 illustrates sequence charts 500 of example processes 536, 538, and 540 that may be implemented by the second wireless network device 400 of FIG. 4. FIG. 5 includes the applications 210, the framework 104, the application interface 206, and the framework component 204 of FIG. 4. Within the applications 210, two example applications, a first application 210A (in FIG. 5 as first app 210A) and a second application 210B (in FIG. 5 as second app 210B).

A first process 536 is an asynchronous driver event. Example framework events may include a client device that has associated on an AP interface on the Wi-Fi card 426, a client interface on the Wi-Fi card 426 that has disassociated from a BSS, a new spatial diagnostics information that is available, a radio on the Wi-Fi card 426 that has changed channel, etc. The first process 536 may begin at the driver 422. The driver 422 may communicate an event signal to the driver interface 424 (502 in FIG. 5). The event signal communicated to the driver interface 424 may include a driver-specific event signal. The driver interface 424 may generate abstracted version of the driver-specific event signal. The abstracted version of the driver-specific event may be a driver-agnostic event signal. The driver interface 424 may then communicate the driver-agnostic event signal to the framework component 204 (504 in FIG. 5). The framework component 204 may perform some processing of the driver-agnostic event signal (506 in FIG. 5) and communicate the driver-agnostic event signal to the application interface 206 (508 in FIG. 5). At the application interface 206, filtering may be performed (510 in FIG. 5). The filtering may be performed by the application interface 206 to generate an application-specific event signal from the driver-agnostic event signal. The application-agnostic event signal may be communicated to the application 210 (512 in FIG. 5).

A second process 538 is a framework initiated command or event. Example commands or events may include a request for a driver to provide updated statistics, a request for a driver to provide updated spatial diagnostic data, a request for a driver for the status of all Wi-Fi channels, etc.

The second process 538 may be similar to the first process 536, but is initiated by a command signal of the framework 104. The second process 538 may begin at the framework component 204. The framework component 204 may communicate a driver-agnostic command signal to the driver interface 424 (514 in FIG. 5). The driver interface 424 may generate a driver-specific command signal from the driver-agnostic command signal, which is communicated to the driver 422 (516 in FIG. 5). The driver 422 may communicate an event signal to the driver interface 424 (518 in FIG. 5). The event signal communicated to the driver interface 424 may include a driver-specific event signal. The driver interface 424 may generate an abstracted version of the driver-specific event signal. The abstracted version of the driver-specific event may include a driver-agnostic event signal. The driver interface 424 may then communicate the driver-agnostic event signal to the framework component 204 (520 in FIG. 5). The framework component 204 may perform some processing of the driver-agnostic event signal (522 in FIG. 5) and communicate the driver-agnostic event signal to the application interface 206 (524 in FIG. 5). At the application interface 206, filtering may be performed (526 in FIG. 5). The filtering may be performed by the application interface 206 to generate an application-specific event signal from the driver-agnostic event signal. The application-agnostic event signal may be communicated to the application 210 (528 in FIG. 5).

A third process 540 includes a process in which the application 210 uses a feature of the framework 104. Example features include a request for an AP interface on a Wi-Fi card to send a specific management frame to one of its clients, a request for a Wi-Fi driver to provide certain management frames to the framework rather than processing them in-driver, configuration of parameters of a spatial diagnostic feature, a request for a Wi-Fi radio to change channel, a configuration of restrictions on the set of channels available to a Wi-Fi radio for operational use, etc. The third process 540 is similar to the first process 536 in an opposite direction. The third process 540 may begin at the application 210. For instance, the third process 540 may begin at the application 210. The application 210 may communicate an invoke framework function signal to the application interface 206 (530 in FIG. 5). The invoke framework function signal may include an application-specific command signal in some embodiments. The application interface 206 may perform some processing of the invoke framework function signal to generate an internal framework command signal (532 in FIG. 5). The internal framework command signal may be an abstraction of the invoke framework function signal and may be application-agnostic. The internal framework command signal may be communicated to the framework component 204 (534 in FIG. 5). The framework component 204 may then perform some additional processing of the internal framework command signal (535 in FIG. 5). For instance, in some embodiments, the framework component 204 may abstract the internal framework command signal. An abstraction of the internal framework command signal may include a driver-agnostic command signal. The framework component 204 may communicate the driver-agnostic command signal to the driver interface 424 (538 in FIG. 5). The driver interface 424 may generate a driver-specific command signal from the driver-agnostic command signal and communicate the driver-agnostic command signal to the driver 422 (540 in FIG. 5).

Figure 6:
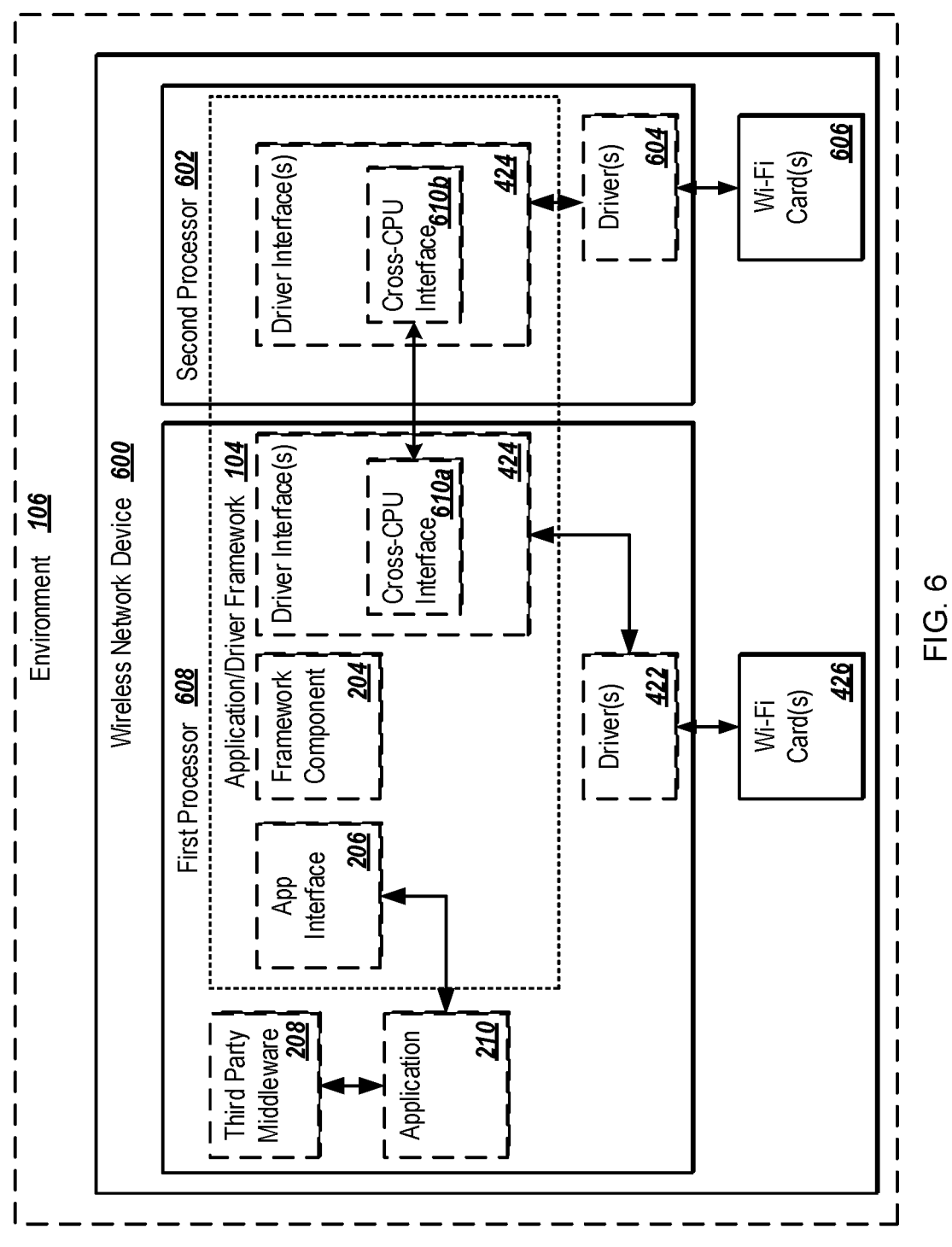
FIG. 6 illustrates a third example embodiment of the wireless network device (third wireless network device) of FIG. 1.

FIG. 6 illustrates a third example wireless network device 600 (hereinafter, third wireless network device 600, or Wi-Fi device 600). The third wireless network device 600 is an example embodiment of the wireless network device 128 described with reference to FIG. 1. For example, the third wireless network device 600 may include similar or corresponding structure and functions to the wireless network device 128. Additionally, the third wireless network device 600 includes the framework component 204, the application interface 206, the applications 210, the framework 104, and the third party middleware 208 of FIGS. 1 and 2. The third wireless network device 600 also includes the driver interface 424 and the driver 422 of FIG. 4. The third wireless network device 600 is depicted in the environment 106 described with reference to FIG. 1. Description of these components is not repeated.

The third wireless network device 600 may include a first processor 608 and a second processor 602. The processor CPU 608 may differ from the second processor 602. For instance, the first CPU 608 may be manufactured by a different vendor than the second processor 602, the first CPU 608 may be a different version than the second processor 602, the first processor 608 may have a different architecture than the second processor 602, or some combination thereof. The second CPU may include a network processing unit (NPU). The NPU may be designed as a programmable microprocessor designed for processing network data packets and tasks commonly associated with the upper layers of the OSI model.

The framework 104 may also include a cross-CPU interface 610. The cross-CPU interface 610 may enable communication of signals within the framework 104 between the first processor 608 and the second processor 602. For example, the cross-CPU interface may bridge driver interfaces on different CPUs and across the different CPUs to enable communications with the framework component. The first processor 608 may include a first cross-CPU interface 610a. The second processor 602 may include a second cross-CPU interface 610b. For example, an event or command signal may be communicated within the framework 104 from the first processor 608 to the second processor 602 via the cross-CPU interfaces 610a and 610b. In at least one embodiment, the cross-CPU interface may be facilitated using a wireless protocol, such as BLUETOOTH®, Bluetooth Low Energy®, Zigbee, mmWave, etc.

The second processor 602 may include a second driver 604, which may be communicatively coupled to a second Wi-Fi card 606. The second driver 604 may communicate signals with the second Wi-Fi card 606. For instance, the second driver 604 may transmit signals to the second Wi-Fi card 606 and may receive signals from the second Wi-Fi card 606. Accordingly, in these and other embodiments, the second driver 604 may be a bidirectional interface.

Figure 7:
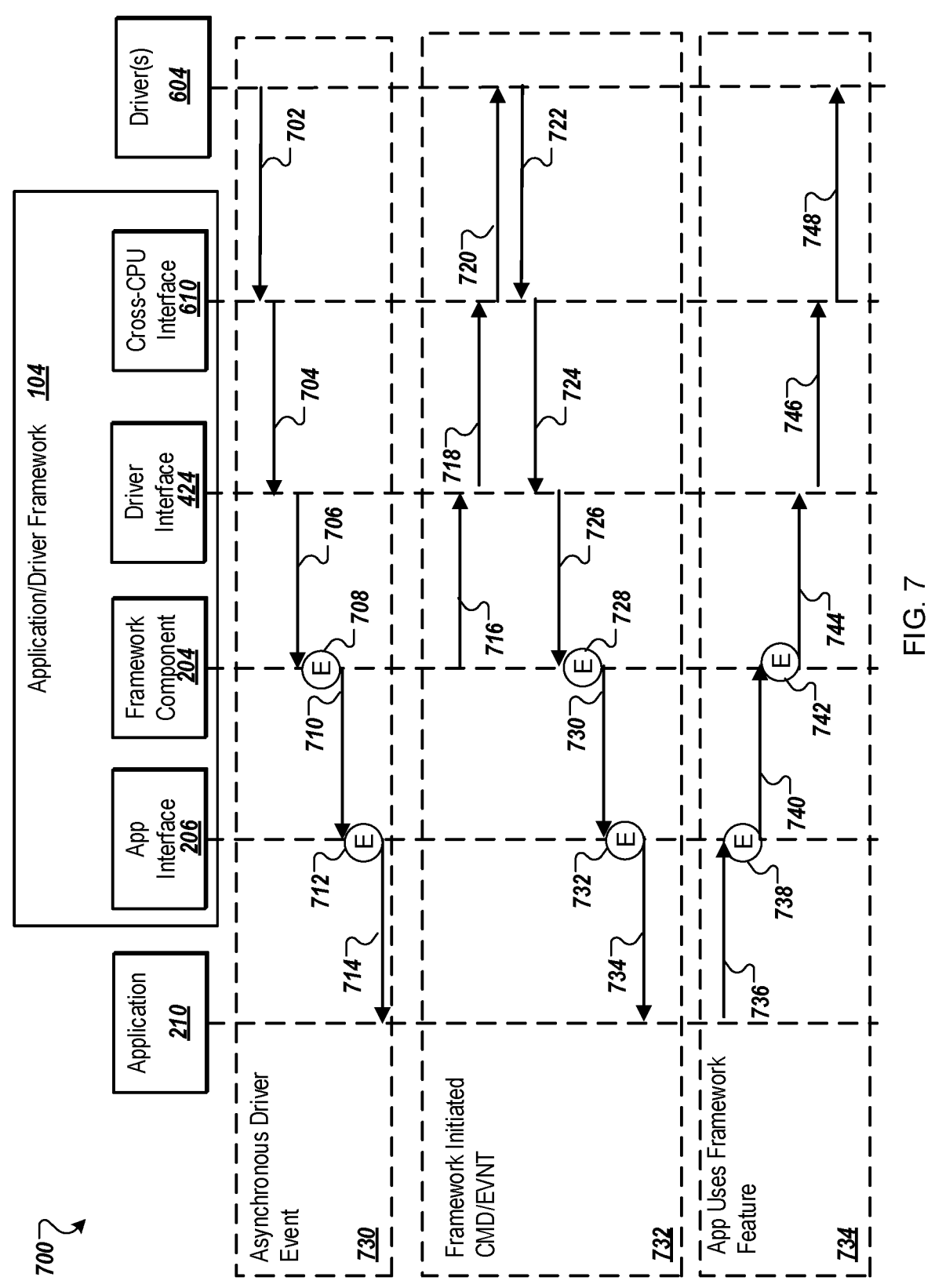
FIG. 7 illustrates sequence charts of example processes that may be implemented by the third wireless network device of FIG. 6.

FIG. 7 illustrates sequence charts 700 of example processes 730, 732, and 734 that may be implemented by the third wireless network device 600 of FIG. 6. FIG. 7 includes the applications 210, the framework 104, the application interface 206, and the framework component 204 of FIG. 2, the driver interface 424 of FIG. 4, and the cross-CPU interface 610 (which may include any number of cross-CPU interfaces, such as the first cross-CPU interface 610a and the second cross-CPU interface 610b of FIG. 6) and the second driver 604 of FIG. 6.

A first process 730 is an asynchronous driver event. The first process 730 may begin at the second driver 604. The second driver 604 may communicate an event signal using the cross-CPU interface 610 (702 in FIG. 7). The event signal communicated using the cross-CPU interface 610 may include a driver-specific event signal. The cross-CPU interface 610 may encapsulate an abstracted version of the driver-specific event signal. The abstracted version of the driver-specific event may be a driver-agnostic event signal. The cross-CPU interface 610 may then communicate the encapsulated driver-agnostic event signal to the driver interface 424 (704 in FIG. 7). The driver interface 424 may unencapsulate the driver-agnostic event signal and communicate the driver-agnostic event signal to the framework component 204 (706 in FIG. 7). The framework component 204 may perform some processing of the driver-agnostic event signal (708 in FIG. 7) and communicate the driver-agnostic event signal to the application interface 206 (710 in FIG. 7). At the application interface 206, filtering may be performed (712 in FIG. 7). The filtering may be performed by the application interface 206 to generate an application-specific event signal from the driver-agnostic event signal. The application-agnostic event signal may be communicated to the application 210 (714 in FIG. 7).

A second process 732 is a framework initiated command or event. The second process 732 may be similar to the first process 730, but is initiated by a command signal of the framework 104. The second process 732 may begin at the framework component 204. The framework component 204 may communicate a driver-agnostic command signal to the driver interface 424 (716 in FIG. 7). The driver interface 424 may encapsulate the driver-agnostic command signal and communicate it using the cross-CPU interface 610 (718 in FIG. 7). The CPU interface may unencapsulate the driver-agnostic command signal and generate a driver-specific command signal, which is communicated to the second driver 604 (720 in FIG. 7). The second driver 604 may communicate an event signal using the cross-CPU interface 610 (722 in FIG. 7). The event signal communicated using the cross-CPU interface 610 may include a driver-specific event signal. The cross-CPU interface 610 may encapsulate an abstracted version of the driver-specific event signal. The abstracted version of the driver-specific event may be a driver-agnostic event signal. The cross-CPU interface 610 may then communicate the encapsulated driver-agnostic event signal to the driver interface 424 (724 in FIG. 7). The driver interface 424 may unencapsulate the driver-agnostic event signal and communicate the driver-agnostic event signal to the framework component 204 (726 in FIG. 7). The framework component 204 may perform some processing of the driver-agnostic event signal (728 in FIG. 7) and communicate the driver-agnostic event signal to the application interface 206 (730 in FIG. 7). At the application interface 206, filtering may be performed (732 in FIG. 7). The filtering may be performed by the application interface 206 to generate an application-specific event signal from the driver-agnostic event signal. The application-agnostic event signal may be communicated to the application 210 (734 in FIG. 7).

A third process 734 is a process in which the application 210 uses a framework feature of the framework 104. The third process 734 is similar to the first process 730, but runs in generally the opposite direction. For instance, the third process 734 may begin at the application 210. The application 210 may communicate an invoke framework function signal to the application interface 206 (736 in FIG. 7). The invoke framework function signal may include an application-specific command signal in some embodiments. The application interface 206 may perform some processing of the invoke framework function signal to generate an internal framework command signal (738 in FIG. 7). The internal framework command signal may be an abstraction of the invoke framework function signal and may be application-agnostic. The internal framework command signal may be communicated to the framework component 204 (740 in FIG. 7). The framework component 204 may then perform some additional processing of the internal framework command signal (742 in FIG. 7). For instance, in some embodiments, the framework component 204 may abstract the internal framework command signal. An abstraction of the internal framework command signal may include a driver-agnostic command signal. The framework component 204 may communicate the driver-agnostic command signal to the driver interface 424 (744 in FIG. 7). The driver interface 424 may encapsulate the driver-agnostic command signal and communicate the encapsulated driver-agnostic command signal to the cross-CPU interface 610 (746 in FIG. 7). The cross-CPU interface 610 may generate a driver-specific command signal from the driver-agnostic command signal and communicate the driver-agnostic command signal to the second driver 604 (748 in FIG. 7).

Figure 8:
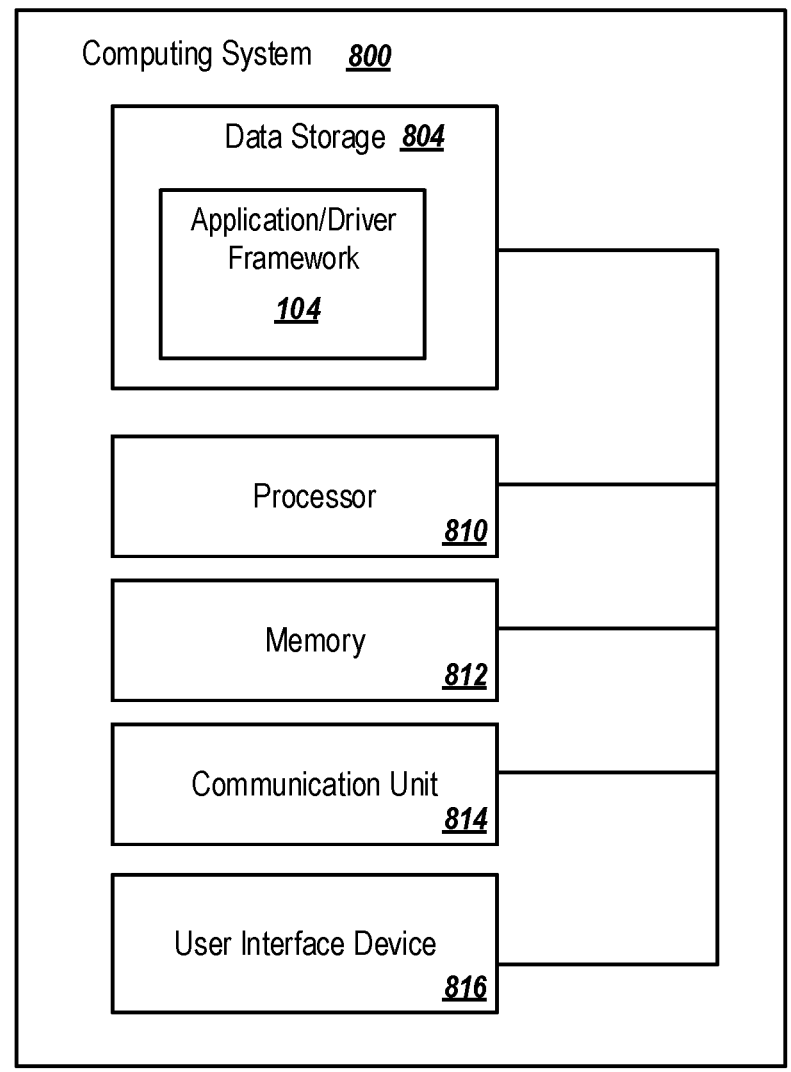
FIG. 8 is an example computing system that may be implemented wireless communication chipset interface and/ or another method or process described in the presented disclosure.

FIG. 8 illustrates an example computing system 800 configured for wireless communication chipset interface and/or another method or process described in the presented disclosure according to at least one embodiment of the present disclosure. The computing system 800 may be implemented in the operating environment 100 of FIG. 1 or another suitable environment. Examples of the computing system 800 may include the wireless network device 128, the cloud server 102, the developer device 110, or some combination thereof. The computing system 800 may include one or more processors 810, a memory 812, a communication unit 814, a user interface device 816, and a data storage 804 that includes the application-driver framework 104.

The processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 8, the processor 810 may more generally include any number of processors configured to perform individually or collectively any number of operations described in the present disclosure. Additionally, one or more of the processors 810 may be present on one or more different electronic devices or computing systems. In some embodiments, the processor 810 may interpret and/or execute program instructions and/or process data stored in the memory 812, the data storage 804, or the memory 812 and the data storage 804. In some embodiments, the processor 810 may fetch program instructions from the data storage 804 and load the program instructions in the memory 812. After the program instructions are loaded into the memory 812, the processor 810 may execute the program instructions.

The memory 812 and the data storage 804 may include computer-readable storage media for carrying or having computer-executable instructions or data structures stored thereon. Such computer-readable storage media may include any available media that may be accessed by a general-purpose or special-purpose computer, such as the processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 814 may include one or more pieces of hardware configured to receive and send communications. In some embodiments, the communication unit 814 may include one or more of an antenna, a wired port, and modulation/demodulation hardware, among other communication hardware devices. In particular, the communication unit 814 may be configured to receive a communication from outside the computing system 800 and to present the communication to the processor 810 or to send a communication from the processor 810 to another device or network (e.g., the network 124 of FIG. 1).

The user interface device 816 may include one or more pieces of hardware configured to receive input from and/or provide output to a user. In some embodiments, the user interface device 816 may include one or more of a speaker, a microphone, a display, a keyboard, a touch screen, or a holographic projection, among other hardware devices.

The application-driver framework 104 may include program instructions stored in the data storage 804. The processor 810 may be configured to load the application-driver framework 104 into the memory 812 and execute the application-driver framework 104. Alternatively, the processor 810 may execute the application-driver framework 104 line-by-line from the data storage 804 without loading them into the memory 812.

Modifications, additions, or omissions may be made to the computing system 800 without departing from the scope of the present disclosure. For example, in some embodiments, the computing system 800 may not include the user interface device 816. In some embodiments, the different components of the computing system 800 may be physically separate and may be communicatively coupled via any suitable mechanism. For example, the data storage 804 may be part of a storage device that is separate from a server, which includes the processor 810, the memory 812, and the communication unit 814, that is communicatively coupled to the storage device. The embodiments described herein may include the use of a special-purpose or general-purpose computer including various computer hardware or software modules, as discussed in greater detail below.

FIG. 9 is a flow diagram of an example method 900 of wireless communication chipset interface, arranged in accordance with at least one embodiment described herein. Although illustrated as discrete blocks, various blocks may be divided into additional blocks, combined into fewer blocks, or eliminated, depending on the desired implementation.

The method 900 may begin at block 902, in which an application-agnostic signal may be communicated. The application-agnostic signal may be communicated between a processor, a framework component, and/or an application interface. For example, the application-agnostic signal may be communicated between the framework component 204 and an application interface, such as the application interface 206. In some embodiments, the application-agnostic signal may include an application-agnostic event signal or an application-agnostic command signal. Additionally, in these and other embodiments, the framework and the application interface may be configured as or included in a Wi-Fi repeater, a Wi-Fi gateway, a WAP, or another suitable wireless network device.

At block 904, an application-specific filtering of the application-agnostic signal may be performed. For example, the application-specific filtering may be configured to convert the application-agnostic signal to an application-specific signal. The application-specific filtering of the application-agnostic signal may be performed by the application interface in some embodiments.

At block 906, the application-specific signal may be communicated. For example, the application-specific signal may be further communicated between the application interface and one or more applications. The one or more applications may be configured to use wireless signal information associated with a wireless network or to invoke a wireless function implemented by the wireless network. In some embodiments, the application interface may be configured to communicate the application-specific signal between the application interface and the applications.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For example, in some embodiments, a first application of the one or more applications may be loaded. The first application may correspond to the application-specific signal. For instance, the application-specific signal may be formatted and configured for use by the first application. The first application may be configured to process the application-specific signal and/or use some information in the application-specific signal. In some embodiments, the application may be dynamically loaded. For instance, the application may be dynamically loaded using a user-space background process. In these and other embodiments, the application may include a library. An example of the library may be a LINUX dynamically loadable library. Other suitable library types may also be implemented. Additionally or alternatively, the first application may be a standalone process interfaced by an inter-process communication bus.

Figure 10:
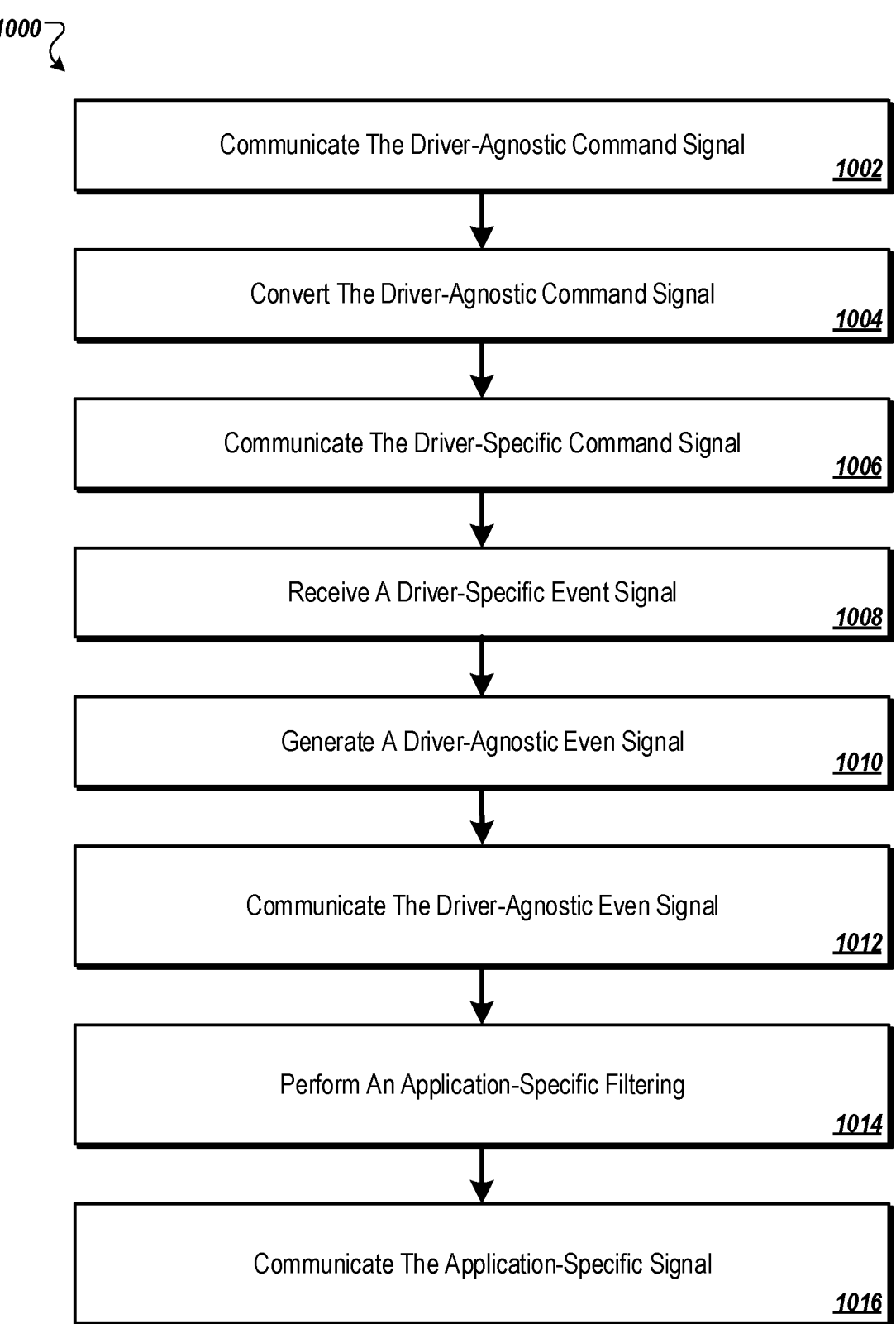
FIG. 10 is a flow diagram of another example method of wireless communication chipset interface.

FIG. 10 is a flow diagram of another example method 1000 of wireless communication chipset interface, arranged in accordance with at least one embodiment described herein. Although illustrated as discrete blocks, various blocks may be divided into additional blocks, combined into fewer blocks, or eliminated, depending on the desired implementation.

The method 1000 may begin at block 1002, in which a driver-agnostic command signal may be communicated. The driver-agnostic command signal may be communicated by a framework component such as the framework component 204. The driver-agnostic command signal may be communicated to a driver interface such as the driver interface 424.

At block 1004, the driver-agnostic command signal may be converted. The driver-agnostic command signal may be converted by the driver interface. The driver-agnostic command signal may be converted to a driver-specific command signal. For example, the driver-agnostic command signal may be converted to a command signal having a particular format or configuration that a particular driver can implement, process, or use.

At block 1006, the driver-specific command signal may be communicated. For example, the driver-specific command signal may be communicated by the driver interface. In some configurations, the driver-specific command signal may be communicated directly to a first wireless signal driver. Additionally or alternatively, in some configurations, the driver-specific command signal may be communicated indirectly to a second wireless signal driver via a CPU interface such as the cross-CPU interface 610.

At block 1008, a driver-specific event signal may be received. For example, the driver-specific event signal may be received from the first wireless signal driver or the second wireless signal driver via the CPU interface. In some embodiments, the driver-specific event signal may be received at a driver interface. In some embodiments in which the method 1000 includes block 1008, the driver interface includes a bidirectional interface that is comprised of two different unidirectional driver interfaces. At block 1010, a driver-agnostic event signal may be generated. For instance, in some embodiments, the driver interface may generate the driver-agnostic event signal. At block 1012, the driver-agnostic event signal may be communicated. For example, the driver-agnostic event signal may be communicated by the driver interface to the framework component and then to an application interface such as the application interface 206. As discussed above, the framework component may be included in an application-driver framework in some embodiments. The application-driver framework and the application interface may be configured as or included in a Wi-Fi repeater, a Wi-Fi gateway, a WAP or another suitable wireless network device.

At block 1014, an application-specific filtering of the driver-agnostic event signal may be performed. For example, the application-specific filtering may be configured to convert the driver-agnostic event signal to an application-specific event signal. The application-specific filtering of the driver-agnostic event signal may be performed by the application interface in some embodiments.

At block 1016, the application-specific event signal may be communicated. For example, the application-specific event signal may be further communicated between the application interface and one or more applications. As described above, the one or more applications may be configured to use wireless signal information associated with a wireless network or to invoke a wireless function implemented by the wireless network. In some embodiments, the application interface may be configured to communicate the application-specific signal between the application interface and the applications. In some embodiments, a first application of the one or more applications may be loaded. The first application may correspond to the application-specific signal. For instance, the application-specific signal may be formatted and configured for use by the first application. The first application may be configured to process the application-specific signal and/or use some information in the application-specific signal. In some embodiments, the application may be dynamically loaded. For instance, the application may be dynamically loaded using a user-space background process. In these and other embodiments, the application may include a library. An example of the library may be a LINUX dynamically loadable library. Other suitable library types may also be implemented. Additionally or alternatively, the first application may be a standalone process interfaced by an inter-process communication bus.

FIG. 11 is a flow diagram of an example method 1100 of application-agnostic signal communication according to at least one embodiment of the present disclosure. The method 1100 may be implemented as a step or portion of another method such as the method 900 described above. The method 1100 may be implemented as block 902 in some embodiments. For instance, the method 1100 may be implemented as 902 in circumstances in which an application-specific signal includes a first application-specific command signal is received from a first application of the applications, and the application-agnostic signal includes a first application-agnostic command signal that is received at the framework component from the application interface. The method 1100 may be implemented in other suitable circumstances and it is not limited to implementation with the method 900. Although illustrated as discrete blocks, various blocks may be divided into additional blocks, combined into fewer blocks, or eliminated, depending on the desired implementation.

The method 1100 may begin at block 1102, in which a driver-agnostic command signal is communicated. For example, the driver-agnostic command signal may be communicated to a driver interface. In some embodiments, a framework component such as the framework component 204 may be configured to communicate the driver-agnostic command signal to the driver interface. At block 1104, the driver-agnostic command signal may be converted. For instance, the driver-agnostic command signal may be converted to a driver-specific command signal. In some embodiments, the driver interface such as the driver interface 424 may be implemented to convert the driver-agnostic command signal to the driver-specific command signal.

In some embodiments, the method 1100 may be implemented by systems and devices that include a CPU interface such as the cross-CPU interface 610 described with reference to FIGS. 6 and 7. In other embodiments, the method 1100 may be implemented by systems and devices without the CPU interface. In embodiments in which the method 1100 is implemented by a system or device that includes the CPU interface, the method 1100 may proceed from block 1104 to block to 1108. In embodiments which the method 1100 is implemented by a system or device that does not includes the CPU interface, the method 1100 may proceed from block 1104 to block 1106.

At block 1106, the driver-specific command signal may be communicated. The driver-specific command signal may be communicated to a first wireless signal driver. In some embodiments, the driver-specific command signal may be communicated by the driver interface.

At block 1108, driver-specific command signal may be communicated. The driver-specific command signal may be communicated to the first wireless signal driver and/or a second wireless signal driver via a CPU interface. In some embodiments, the driver-specific command signal may be communicated by the driver interface. Additionally, in some embodiments, the first wireless signal driver and the second wireless signal driver may be from different vendors, have different architectures, may be different versions, or some combination thereof.

Figure 12:
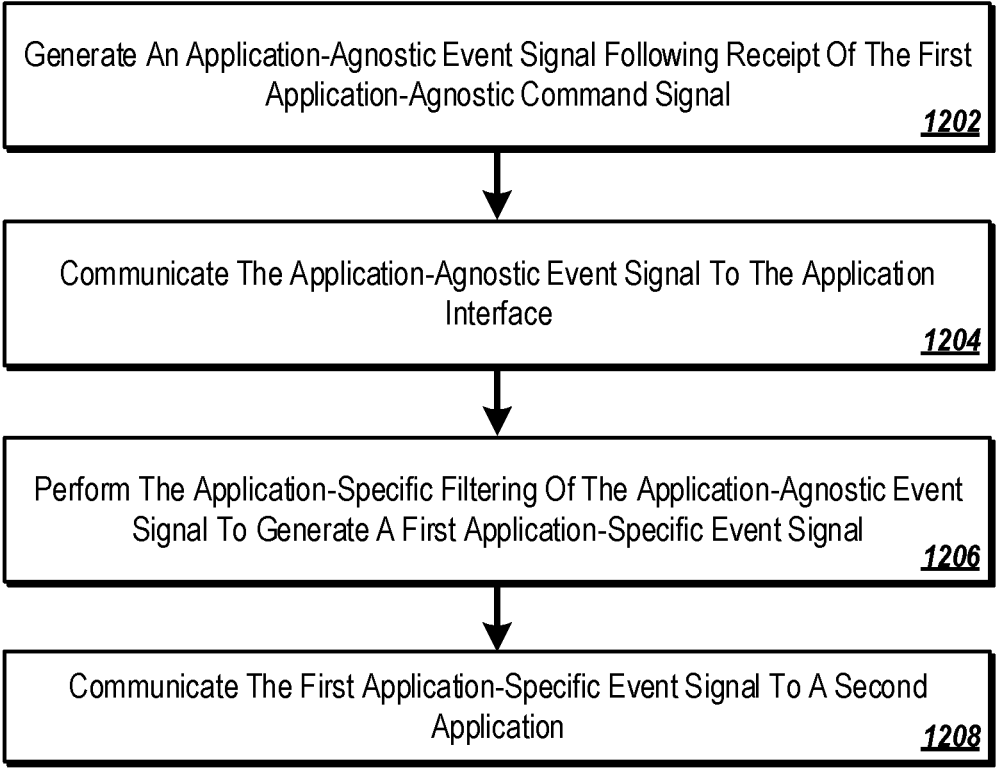
FIG. 12 is a flow diagram of an example method 1200 of application-agnostic signal communication, all according to at least one embodiment described in the present disclosure.

FIG. 12 is a flow diagram of an example method 1200 of application-agnostic signal communication according to at least one embodiment of the present disclosure. The method 1200 may be implemented as a step or portion of another method such as the method 900. The method 1200 may be implemented as block 902 in some embodiments. For instance, the method 1200 may be implemented as 902 in circumstances in which application-specific signal includes a first application-specific command signal is received from a first application of the applications and the application-agnostic signal includes a first application-agnostic command signal that is received at the framework component from the application interface. The method 1200 may be implemented in other suitable circumstances and it is not limited to implementation with the method 900. Although illustrated as discrete blocks, various blocks may be divided into additional blocks, combined into fewer blocks, or eliminated, depending on the desired implementation.

The method 1200 may begin at block 1202 at which an application-agnostic event signal may be generated. The application-agnostic event signal may be generated following receipt of the first application-agnostic command signal. In some embodiments, a framework component such as the framework component 204 may be configured to generate the application-agnostic event signal.

At block 1204, the application-agnostic event signal may be communicated. For instance, the application-agnostic event signal may be communicated to an application interface. In some embodiments, the application-agnostic event signal may then be communicated to the application interface.

At block 1206, an application-specific filtering of the application-agnostic event signal may be performed. The application-specific filtering of the application-agnostic event signal may be performed to generate a first application-specific event signal. In some embodiments, an application interface may be configured to perform the application-specific filtering of the application-agnostic event signal.

At block 1208, the first application-specific event signal may be communicated. For instance, the first application-specific event signal may be communicated to a second application of the one or more applications. In some embodiments, the first application-specific event signal may be communicated the to a second application of the one or more applications. The second application is different from the first application included in the one or more applications.

The methods 900, 1000, 1100, and 1200 may be programmably performed in some embodiments by the wireless network device 128 and/or the framework 104 described elsewhere in the present disclosure. The wireless network device 128 and/or the framework 104 include or may be communicatively coupled to a non-transitory computer-readable medium (e.g., the memory 812 of FIG. 8) having stored thereon or encoded therein programming code or instructions that are executable by a processor to perform or control performance of the methods 900, 1000, 1100, and 1200. Additionally or alternatively, the wireless network device 128 may include a processor (e.g., the processor 810 of FIG. 8 or the processor 202 described herein) that is configured to execute computer instructions to perform or control performance of the methods 900, 1000, 1100, and 1200.

The following examples pertain to further embodiments.

Example 1 includes wireless network device including a wireless signal drive. The wireless network device includes an application-driver framework configured for application-agnostic and driver-agnostic communication. The application-driver framework includes a bidirectional interface that communicatively couples the wireless signal driver to the application-driver framework. The bidirectional interface includes an abstraction layer via which driver-agnostic command signals and driver-agnostic event signals are communicated with the application-driver framework and via which driver-specific command signals and driver-specific event signals are communicated with the wireless signal driver. The application-driver framework includes an application interface that is configured to interface one or more applications with the application-driver framework. The application interface is configured to communicate application-agnostic command signals and application-agnostic event signals with the application-driver framework and to communicate application-specific event signals and application-specific command signals with the one or more applications and the application-driver framework.

In Example 2, the subject matter of Example 1 further including a central processing unit (CPU) where the wireless signal driver and the bidirectional interface are included in the application-driver framework and the application-driver framework is included on the CPU.

In Example 3, the subject matter of any one of Examples 1-2, further including a first chipset and a second chipset, where the wireless signal driver is separate and distinct from the bidirectional interface and from the application-driver framework, the bidirectional interface and the application-driver framework are included on the first chipset, the second chipset, or both the first and second chipsets, and the wireless signal driver is included on the second chipset.

In Example 4, the subject matter of any one of Examples 1-3, where the wireless signal driver, the application-driver framework, the bidirectional interface, and the application interface are included on a single central processing unit (CPU).

In Example 5, the subject matter of any one of Examples 1-4, where the first chipset and the second chipset are from different vendors, have different architectures, or have different versions.

In Example 6, the subject matter of any one of Examples 1-5, where the wireless signal driver is a first wireless signal driver and the wireless network device further includes a first central processing unit (CPU), a second CPU, a CPU interface configured to enable communication between the first CPU and the second CPU, and a second wireless signal driver.

In Example 7, the subject matter of any one of Examples 1-6, where the first wireless signal driver is separate and distinct from the bidirectional interface and from the application-driver framework, the first wireless signal driver, the application-driver framework, the bidirectional interface, a first portion of the CPU interface, and the application interface are included on the first CPU, the second wireless driver and a second portion of the CPU interface are included on the second CPU, the first wireless signal driver is configured to drive a first wireless signal card, and the second wireless signal driver is configured to drive a second wireless signal card.

In Example 8, the subject matter of any one of Examples 1-7, where at least one application of the one or more applications includes a library, the application-driver framework is configured to implement a user-space background process, and the at least one application is dynamically loaded by the user-space background process.

In Example 9, the subject matter of any one of Examples 1-8, where at least one application is implemented as a dynamically loadable library, or a standalone process interfaced by an inter-process communication bus.

In Example 10, the subject matter of any one of Examples 1-9, where the one or more applications is configured to use wireless signal information associated with a wireless network or to invoke a wireless function implemented by the wireless network, and the wireless network is generated or supported by the wireless signal driver.

In Example 11, the subject matter of any one of Examples 1-10, where the one or more applications includes one or more or a combination of a home ESS management application, a media access control (MAC) sublayer management entity (MLME) delegation, a client steering application, a channel and power management application, application management, a data path control application, and a spatial diagnostic application.

In Example 12, the subject matter of any one of Examples 1-11, further including a first chipset including a first chipset architecture, and a second chipset including a second chipset architecture, where a first application of the one or more applications is run on the first chipset, a second application of the one or more applications is run on the second chipset, and the application-driver framework is configured to provide compatibility between the first application and the second application.

In Example 13, the subject matter of any one of Examples 1-12, where the wireless signal driver, the application-driver framework, the bidirectional interface, and the application interface are configured as a Wi-Fi repeater, a wireless access point (WAP), or a Wi-Fi gateway.

Example 14 includes a method of wireless communication chipset interface in a wireless network device. The method includes communicating, an application-agnostic signal between a framework component of an application-driver framework and an application interface, the application-agnostic signal including an application-agnostic event signal or an application-agnostic command signal, performing, by the application interface, an application-specific filtering of the application-agnostic signal, the application-specific filtering being configured to convert the application-agnostic signal to an application-specific signal, and further communicating, by the application interface, the application-specific signal between the application interface and one or more applications.

In Example 15, the subject matter of Example 14, where the application-specific signal includes a first application-specific command signal that is received from a first application of the one or more applications, and the application-agnostic signal includes a first application-agnostic command signal that is received at the framework component from the application interface.

In Example 16, the subject matter of any one of Examples 14-15 further including generating, by the framework component, an application-agnostic event signal following receipt of the first application-agnostic command signal, communicating, by the framework component, the application-agnostic event signal to the application interface, performing, by the application interface, the application-specific filtering of the application-agnostic event signal to generate a first application-specific event signal, and communicating, by the application interface, the first application-specific event signal to a second application of the one or more applications.

In Example 17, the subject matter of any one of Examples 14-16 further including receiving, at a driver interface, a driver-specific event signal from a first wireless signal driver, generating, by the driver interface, a driver-agnostic event signal, and communicating, by the driver interface, the driver-agnostic event signal to the framework component.

In Example 18, the subject matter of any one of Examples 14-17, where the driver interface includes a bidirectional interface that includes of two different unidirectional driver interfaces.

In Example 19, the subject matter of any one of Examples 14-18 further including communicating, by the framework component, a driver-agnostic command signal to the driver interface, converting, by the driver interface, the driver-agnostic command signal to a driver-specific command signal, and communicating, by the driver interface, the driver-specific command signal directly to the first wireless signal driver or indirectly to a second wireless signal driver via a central computing unit (CPU) interface.

In Example 20, the subject matter of any one of Examples 14-19, where the application-specific signal includes a first application-specific command signal that is received from a first application of the one or more applications, and the application-agnostic signal includes a first application-agnostic command signal that is received at the framework component from the application interface.

In Example 21, the subject matter of any one of Examples 14-20 further including communicating, by the framework component, a driver-agnostic command signal to the driver interface, converting, by the driver interface, the driver-agnostic command signal to a driver-specific command signal, and communicating, by the driver interface, the driver-specific command signal directly to a first wireless signal driver or indirectly to the first wireless signal driver and a second wireless signal driver via a central computing unit (CPU) interface.

In Example 22, the subject matter of any one of Examples 14-21, where the first wireless signal driver and the second wireless signal driver are from different vendors, have different architectures, or are different versions.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described in this disclosure can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A wireless network device, comprising:
a wireless signal driver configured to generate a Wi-Fi network;
an application-driver framework configured for application-agnostic and driver-agnostic communication, the application-driver framework including:
a bidirectional interface that communicatively couples the wireless signal driver to the application-driver framework, the bidirectional interface being configured to convert driver-agnostic command signals to driver-specific command signals and to convert driver-specific event signals to driver-agnostic event signals; and
an application interface that is configured to interface one or more applications with the application-driver framework, the application interface being configured to communicate application-agnostic command signals and application-agnostic event signals with the application-driver framework and to communicate application-specific event signals and application-specific command signals with the one or more applications and the application-driver framework, the application interface being configured to perform application-specific filtering to convert application-agnostic event signals to application-specific event signals, wherein a first application of the one or more applications being related to interacting with a physical environment, by using changes in Wi-Fi signals for spatial diagnostics or motion detection.

2. The wireless network device of claim 1, wherein:
at least one application of the one or more applications includes a library;
the application-driver framework is configured to implement a user-space background process; and
the at least one application is dynamically loaded by the user-space background process.

3. The wireless network device of claim 1, wherein at least one application is implemented as:
a dynamically loadable library; or
a standalone process interfaced by an inter-process communication bus.

4. The wireless network device of claim 1, wherein:
the one or more applications is configured to use wireless signal information associated with a wireless network or to invoke a wireless function implemented by the wireless network; and
the wireless network is generated or supported by the wireless signal driver.

5. The wireless network device of claim 4, wherein the one or more applications includes one or more or a combination of:
a home management application;
a media access control (MAC) sublayer management entity (MLME) delegation;
a client steering application;
a channel and power management application;
application management;
a data path control application; and
a spatial stream diagnostic application.

6. The wireless network device of claim 4, further comprising:
a first chipset including a first chipset architecture; and
a second chipset including a second chipset architecture, wherein:
a first application of the one or more applications is run on the first chipset;
a second application of the one or more applications is run on the second chipset; and
the application-driver framework is configured to provide compatibility between the first application and the second application.

7. The wireless network device of claim 1, wherein the wireless signal driver, the application-driver framework, the bidirectional interface, and the application interface are configured as a Wi-Fi repeater, a wireless access point (WAP), or a Wi-Fi gateway.

8. The wireless network device of claim 1, wherein the application-driver framework is configured to initiate an asynchronous framework event that as the application agnostic event signal, the asynchronous framework event including at least one of a periodic application update, an application restart event, or an application quit event.

9. The wireless network device of claim 1, wherein the application-driver framework is configured to provide a compatible interface between a first application of the one or more applications and a second application of the one or more applications and the wireless signal driver, the first application and the second application developed by different developers and listed on a cloud server as usable with the wireless network device.

10. A method performed by a wireless network device, the method comprising:
providing a wireless network by the wireless network device using a wireless signal driver, the wireless signal driver configured to generate a Wi-Fi network;
interfacing the wireless signal driver with a bi-directional interface, the bi-directional interface converting driver-agnostic command signals to driver-specific command signals and converting driver-specific event signals to driver-agnostic event signals;
interfacing one or more applications with an application-driver framework of a bi-directional interface via an application interface, a first application of the one or more applications being related to interacting with a physical environment by using changes in Wi-Fi signals for spatial diagnostics or motion detection;

communicating an application-agnostic command signal, via the application interface, to the application-driver framework;

communicating an application-agnostic event signal, via the application interface, to the application-driver framework;

communicating an application-specific command signal, via the application interface, to the one or more applications; and communicating an application-specific event signal, via the application interface, to the one or more applications, the application interface performing application-specific filtering to convert application-agnostic event signals to application-specific event signals.

11. The method of claim 10, further comprising:

implementing a user-space background process by the application-driver framework; and dynamically loading at least one application of the one or more applications by the user-space background process, the at least one application including a library.

12. The method of claim 10, further comprising implementing at least one application of the one or more applications as a dynamically loadable library or a standalone process interfaced by an inter-process communication bus.

13. The method of claim 10, further comprising:

using, by the one or more applications, wireless signal information associated with a wireless network generated or supported by the wireless signal driver; or invoking, by the one or more applications, a wireless function implemented by the wireless network.

14. The method of claim 13, wherein the one or more applications includes one or more of or a combination of:

a home management application;

a media access control (MAC) sublayer management entity (MLME) delegation;

a client steering application;

a channel and power management application;

application management;

a data path control application; and a spatial stream diagnostic application.

15. The method of claim 10, wherein the application-agnostic event signal includes an asynchronous framework event, the method further comprising:

filtering, by the application interface, the asynchronous framework event to generate the application-specific event signal from the application-agnostic event signal.

16. The method of claim 15, wherein the asynchronous framework event includes at least one of a periodic application update, an application restart event, or an application quit event.

17. The method of claim 10, further comprising:

communicating a signal to the application interface from a first application of the one or more applications, the signal including an application-specific invoke command; and filtering, by the application interface, the application-specific invoke command to generate an application-agnostic invoke command, wherein the application-agnostic invoke command is the application-agnostic command signal communicated via the application interface to the application-driver framework.

18. The method of claim 17, wherein the application-specific invoke command includes a command to update the first application, restart the first application, or quit the first application.

19. The method of claim 10, further comprising:

communicating a signal to the application interface from a first application of the one or more applications, the signal including a first application-specific command signal;

filtering, by the application interface, the first application-specific command to generate the application-agnostic command signal that is communicated to the application-driver framework;

performing processing of the application-agnostic command signal by the application-driver framework;

communicating a framework event from the application-driver framework to the application interface as at least part of the application-agnostic event signal, the framework event based on the processing of the application-agnostic command signal; and filtering, by the application interface, the application-agnostic event signal to generate the application-specific event signal that is communicated to the one or more applications, wherein the application-specific event signal is specifically compatible with a second application of the one or more applications that is different from the first application; and wherein communicating the application-specific event signal to the one or more applications includes communicating the application-specific event signal to the second application.

20. One or more non-transitory computer-readable media within a wireless network device, the non-transitory computer-readable media storing instructions which, when executed by one or more processors, cause the wireless network device to perform one or more operations, the operations comprising:

providing a wireless network by the wireless network device using a wireless signal driver, the wireless signal driver configured to generate a Wi-Fi network;

interfacing the wireless signal driver with a bi-directional interface, the bi-directional interface converting driver-agnostic command signals to driver-specific command signals and converting driver-specific event signals to driver-agnostic event signals;

interfacing one or more applications with an application-driver framework of a bi-directional interface via an application interface, a first application of the one or more applications being related to interacting with a physical environment by using changes in Wi-Fi signals for spatial diagnostics or motion detection;

communicating an application-agnostic command signal, via the application interface, to the application-driver framework;

communicating an application-agnostic event signal, via the application interface, to the application-driver framework;

communicating an application-specific command signal, via the application interface, to the one or more applications; and communicating an application-specific event signal, via the application interface, to the one or more applications, the application interface performing application- specific filtering to convert application-agnostic event signals to application-specific event signals.

* * * * *